(12) United States Patent
Lee

(10) Patent No.: US 9,646,411 B2
(45) Date of Patent: May 9, 2017

(54) VIRTUAL THREE-DIMENSIONAL MODEL GENERATION BASED ON VIRTUAL HEXAHEDRON MODELS

(71) Applicant: HedronX Inc., Los Angeles, CA (US)

(72) Inventor: Myung Hak Lee, Seoul (KR)

(73) Assignee: HedronX Inc., Los Angeles, CA (US)

( * ) Notice: Subject to any disclaimer, the term of this patent is extended or adjusted under 35 U.S.C. 154(b) by 0 days.

(21) Appl. No.: 15/086,036

(22) Filed: Mar. 30, 2016

(65) Prior Publication Data

US 2016/0292909 A1    Oct. 6, 2016

Related U.S. Application Data

(60) Provisional application No. 62/142,001, filed on Apr. 2, 2015.

(51) Int. Cl.
| | |
|---|---|
| *G06T 17/00* | (2006.01) |
| *G06T 15/20* | (2011.01) |
| *G06T 17/10* | (2006.01) |
| *G06T 11/00* | (2006.01) |
| *G06T 17/20* | (2006.01) |

(52) U.S. Cl.
CPC .......... *G06T 15/205* (2013.01); *G06T 11/003* (2013.01); *G06T 17/00* (2013.01); *G06T 17/10* (2013.01); *G06T 17/20* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2003/0071810 A1* | 4/2003 | Shoov | G06F 17/50 345/420 |
| 2004/0070582 A1* | 4/2004 | Smith | A61B 8/4254 345/419 |
| 2006/0290695 A1* | 12/2006 | Salomie | G06T 17/20 345/420 |
| 2011/0298800 A1 | 12/2011 | Schlichte et al. | |

(Continued)

FOREIGN PATENT DOCUMENTS

WO     WO 2008/063081 A2     5/2008

OTHER PUBLICATIONS

PCT International Search Report and Written Opinion, PCT Application No. PCT/US2016/025412, Jul. 1, 2016, 25 pages.

*Primary Examiner* — Martin Mushambo
(74) *Attorney, Agent, or Firm* — Fenwick & West LLP

(57) ABSTRACT

Disclosed embodiments include a method (system and non-transitory computer storage readable medium) for generating 3-dimensional model data of a virtual 3-dimensional model based on a plurality of 2-dimensional cross-sectional images of a 3-dimensional object. The 3-dimensional model of the 3-dimensional object is generated based on a plurality of virtual hexahedron models. The plurality of hexahedron models are generated based on respective pixels in the 2-dimensional cross-sectional images of the object. By generating the 3-dimensional model of the object including the plurality of hexahedron models, objects within another object can be accurately represented. In addition, the 3-dimensional model is guaranteed to have a closed shape, hence 3-dimensional printing of the 3-dimensional model can be performed successfully.

21 Claims, 26 Drawing Sheets

(56) References Cited

U.S. PATENT DOCUMENTS

2012/0002840 A1* 1/2012 Linnenbank ............ G06K 9/32
                                                    382/103
2015/0029184 A1   1/2015 Masumoto

* cited by examiner

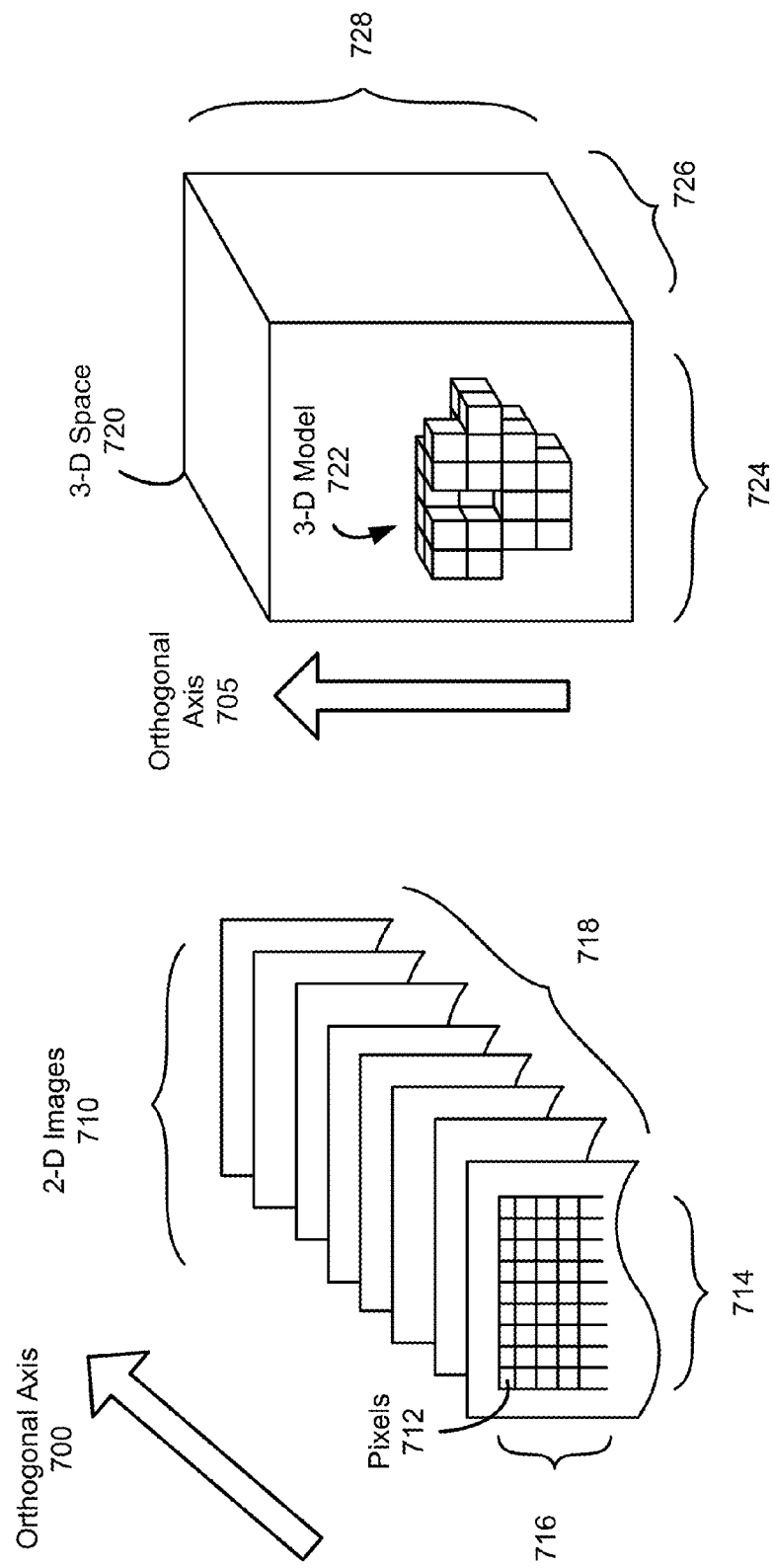

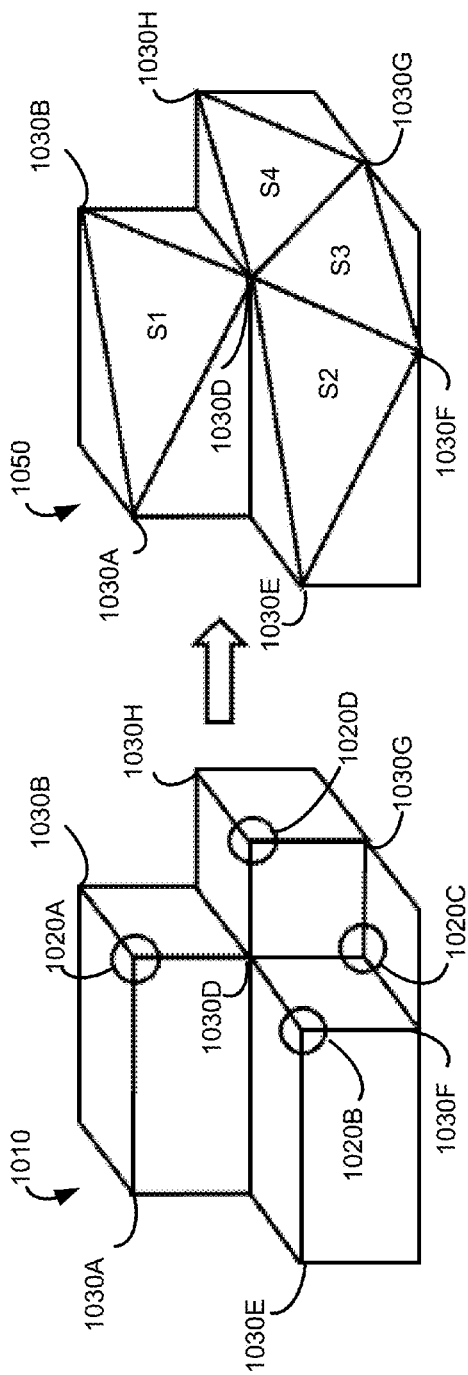
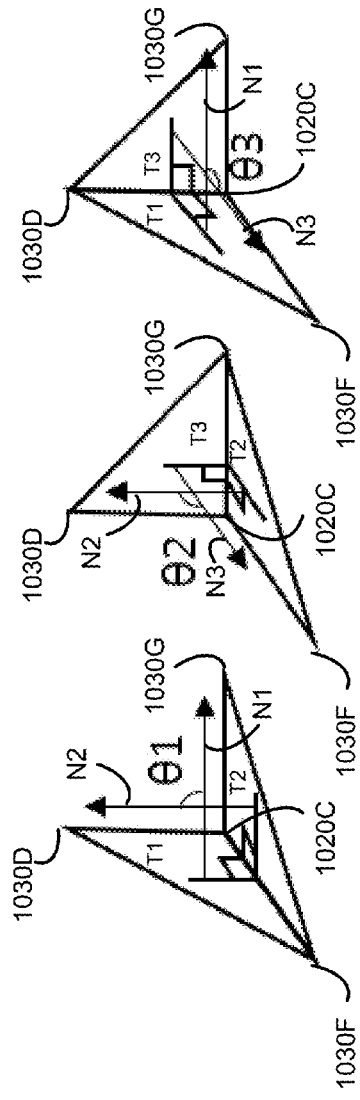
FIG. 10A
FIG. 10B

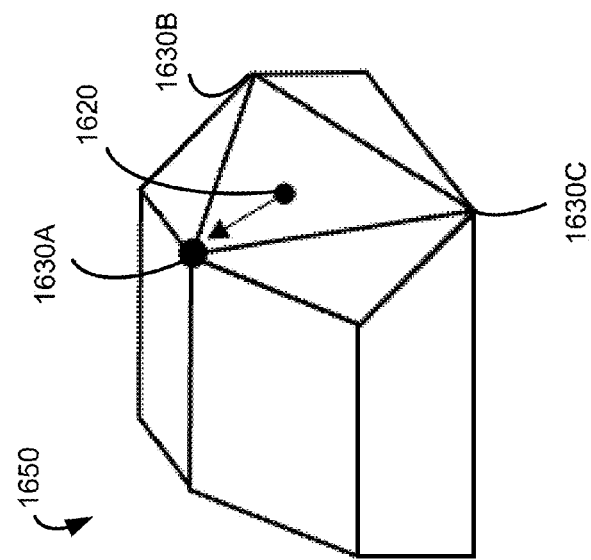
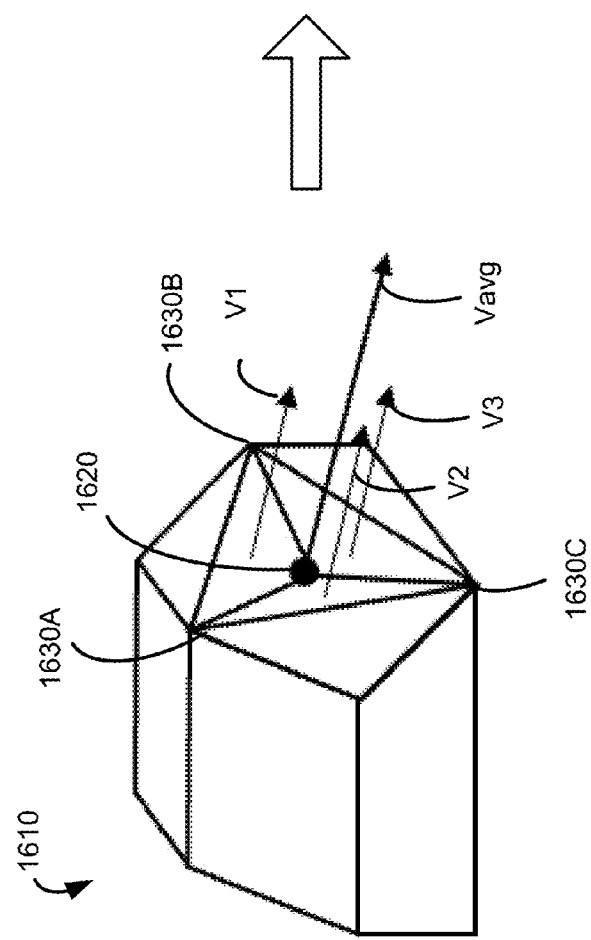
FIG. 16

VIRTUAL THREE-DIMENSIONAL MODEL GENERATION BASED ON VIRTUAL HEXAHEDRON MODELS

CROSS-REFERENCE TO RELATED APPLICATION

This application claims priority under 35 U.S.C. §119(e) from co-pending U.S. Provisional Patent Application No. 62/142,001, entitled "Advanced 3D Polyhedron Engine for Medical Imagery" filed on Apr. 2, 2015, which is incorporated by reference herein in its entirety.

BACKGROUND

1. Field Art

The disclosure generally relates to the field of a virtual model generation, and in particular to a computer implemented process of generating a three dimensional virtual model.

2. Background Information

Three dimensional (3-D) models provide ease of understanding of objects with complex shapes. Through a computer generated virtual 3-D model of a 3-D object, shapes and arrangements of various components of the object from different points of views can be visually presented. Additionally, the 3-D model can be modified to simulate a case in which the object is modified or repositioned. Moreover, the 3-D model can be rendered into a tangible replica through a 3-D printer.

In one example, a 3-D model can be generated based on 2-D cross-sectional images (e.g., computerized tomography (CT) scan or magnetic resonance imaging (MRI) scan images). Figure (FIG. 1 illustrates an example CT scan image 100 of a head of a human subject including objects 110, 120, 130, 140, 160, 180 (e.g., temporomandibular joints 110, 180, vertebral foramen 120, vertebra 130, and teeth 140, 160). Example objects include bones, teeth, or any body parts for determining a medical status of the subject.

FIGS. 2A and 2B illustrate an example conventional process of generating a 3-D model from two CT scan images. In a conventional approach, edges of objects 110A, 130A, 140A, 160A, and 180A of a first CT scan image are extracted, and edges of corresponding objects 110B, 130B, 140B, 160B, and 180B of a second CT scan image are extracted. By connecting corresponding edges, surfaces 215, 235, 245, 265, and 285 of 3-D models 210, 230, 240, 260, and 280 can be generated. Accordingly, the 3-D models 210, 230, 240, 260, and 280 corresponding to objects 110, 130, 140, 160, and 180, respectively, can be obtained.

However, a 3-D model generated through the conventional approach cannot represent objects placed within another object. For example, by extracting the edges 130A, 130B and generating the surface 235 by connecting the edges 130A, 130B, the object 120 within the object 130 is ignored. Accordingly, a 3-D model obtained through the conventional approach cannot accurately represent objects that are enclosed or surrounded by other objects.

Moreover, a 3-D model generated through the conventional approach may have an unclosed (or open) shape. In the conventional approach, if two edges are determined to be not part of a same object, a surface between two edges is omitted. The absence of a closed surface becomes a hole, thereby resulting in the open shape. For example, as shown in FIG. 3, holes 310A . . . 310F are generated, because edges around the holes 310 are determined to be part of different objects. Such open shapes due to these holes in the 3-D model cause inner parts of the objects and external parts of the objects to be indistinguishable. As a result, the 3-D model with an open shape cannot be 3-D printed or causes inaccurate 3-D printing of the 3-D model.

SUMMARY

Embodiments relate to a computer-implemented method of generating 3-dimensional model data based on a plurality of 2-dimensional cross-sectional images of a 3-dimensional object. The method includes receiving a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensional axes, the second cross-sectional image corresponding to a second location of the 3-dimensional object along the one of the 3-dimensional axes separated from the first location, both the first set of image data and the second set of image data including a plurality of pixels each associated with its 2-dimensional coordinate and pixel value; identifying a first set of 2-dimensional coordinates of a first set of pixels from the pixels of the first cross-sectional image, the first set of pixels associated with first pixel values within a predetermined pixel value range; identifying a second set of 2-dimensional coordinates of a second set of pixels from the pixels of the second cross-sectional image, the second set of pixels associated with second pixel values within the predetermined pixel value range; generating a first set of hexahedron data representing first hexahedron models, each of the first set of hexahedron data associated with a corresponding hexahedron model from the first hexahedron models at a corresponding coordinate from the first set of 2-dimensional coordinates; generating a second set of hexahedron data representing second hexahedron models, each of the second set of hexahedron data associated with a corresponding hexahedron model from the second hexahedron models at a corresponding coordinate from the second set of 2-dimensional coordinates; and generating the 3-dimensional model data based on the first set of hexahedron data and the second set of hexahedron data.

In one or more embodiments, each of the first hexahedron models may have a uniform height, and each of the second hexahedron models may have the uniform height. The uniform height may correspond to a distance between the first location and the second location along said one of the 3-dimensional axes. In some embodiments, the first hexahedron models and the second hexahedron models may be cubes.

In one or more embodiments, generating the 3-dimensional model data based on the first set of hexahedron data and the second set of hexahedron data includes adjoining adjacent hexahedron models among the first hexahedron models and the second hexahedron models. Adjoining the adjacent hexahedron models among the first hexahedron models and the second hexahedron models may include generating surface data including coordinates of closed surfaces of the adjoined hexahedron models, the adjoined hexahedron models surrounded by the closed surfaces. In one aspect, the surface data may not include coordinates of open surfaces between two adjacent hexahedron models.

In one or more embodiments, each of the closed surfaces of the hexahedron models consists of two triangles.

In one or more embodiments, generating the 3-dimensional model data based on the first set of hexahedron data and the second set of hexahedron data further includes: identifying a vertex of the adjoined hexahedron models to be removed, the vertex being a common vertex for three triangles of the closed surfaces, the three triangles orthogonal to each other; generating a new triangle having adjacent vertexes of the common vertex for its three vertexes; and removing the vertex and the three triangles.

In one or more embodiments, generating the 3-dimensional model data based on the first set of hexahedron data and the second set of hexahedron data includes: identifying a first triangle and a second triangle of the adjoined hexahedron models sharing a common side, the first triangle and the second triangle orthogonal to each other; generating a new triangle having three vertexes, the three vertexes including: a first vertex of the first triangle away from the common side, a second vertex of the second triangle away from the common side, and a third vertex being a first end of the common side; and removing a second end of the common side, the first triangle and the second triangle.

In one or more embodiments, generating the 3-dimensional model data based on the first set of hexahedron data and the second set of hexahedron data includes: identifying an offset vertex, the offset vertex shared by three triangles, each of the three triangles having a distance vector from a center of a triangle to an adjacent vertex of the offset vertex away from the triangle, distance vectors of said each of the three triangles having a same polarity; shifting the offset vertex to an adjacent vertex of the offset vertex; and removing overlapping triangles after shifting the offset vertex.

In one or more embodiments, generating the 3-dimensional model data based on the first set of hexahedron data and the second set of hexahedron data includes: identifying three lateral triangles of the adjoined hexahedron models, the three lateral triangles sharing a common vertex and being orientated within a predetermined surface orientation range; generating a new triangle having adjacent vertexes of the common vertex for its three vertexes; and removing the common vertex and the three triangles.

In one or more embodiments, generating the 3-dimensional model data based on the first set of hexahedron data and the second set of hexahedron data includes: identifying two right angle triangles of the adjoined hexahedron models, the two right angle triangles sharing a common vertex and a common side, two right angles of the two right angle triangles formed at the common vertex; identifying a longest side among a plurality of sides, an end of each of the plurality of sides being the common vertex; identifying a shortest side among the plurality of sides; obtaining an average between a length of the longest side and a length of the shorted side; and shifting the common vertex towards an end of the longest side away from the common vertex by a half of the average.

In one or more embodiments, the method further includes receiving a third set of image data representing a third cross-sectional image of the plurality of 2-dimensional cross-sectional images, the third cross-sectional image corresponding to a third location of the 3-dimensional object along the one of 3-dimensional axes, identifying a third set of 2-dimensional coordinates of a third set of pixels from pixels of the third cross-sectional image, the third set of pixels associated with third pixel values within the predetermined pixel value range, and generating a third set of hexahedron data representing third hexahedron models, each of the third set of hexahedron data associated with a corresponding hexahedron model from the third hexahedron models at a corresponding coordinate from the third set of 2-dimensional coordinates, wherein the 3-dimensional model data are generated further based on the third set of hexahedron data.

Another embodiment relates to a non-transitory computer readable storage medium comprising instructions to generate 3-dimensional model data based on a plurality of 2-dimensional cross-sectional images of a 3-dimensional object. The instructions when executed by a processor cause the processor to: receive a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensionsional axes, the second cross-sectional image corresponding to a second location of the 3-dimensional object along the one of the 3-dimensional axes separated from the first location, both the first set of image data and the second set of image data including 2-dimensional coordinates and pixel values, each pixel of the first cross-sectional image and the second cross-sectional image associated with its 2-dimensional coordinate and pixel value; identify a first set of 2-dimensional coordinates of a first set of pixels from the pixels of the first cross-sectional image, the first set of pixels associated with first pixel values within a predetermined pixel value range; identify a second set of 2-dimensional coordinates of a second set of pixels from the pixels of the second cross-sectional image, the second set of pixels associated with second pixel values within the predetermined pixel value range; generate a first set of hexahedron data representing first hexahedron models, each of the first set of hexahedron data associated with a corresponding hexahedron model from the first hexahedron models at a corresponding coordinate from the first set of 2-dimensional coordinates; generate a second set of hexahedron data representing second hexahedron models, each of the second set of hexahedron data associated with a corresponding hexahedron model from the second hexahedron models at a corresponding coordinate from the second set of 2-dimensional coordinates; and generate the 3-dimensional model data based on the first set of hexahedron data and the second set of hexahedron data. In some embodiments, the first hexahedron models and the second hexahedron models may be cubes.

One or more embodiments relate to a system for generating 3-dimensional model data based on a plurality of 2-dimensional cross-sectional images of a 3-dimensional object. The system comprises: a processor; and a non-transitory computer readable storage medium comprising instructions when executed by the processor cause the processor to: receive a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensionsional axes, the second cross-sectional image corresponding to a second location of the 3-dimensional object along the one of the 3-dimensional axes separated from the first location, both the first set of image data and the second set of image data including a plurality of pixels each associated with its 2-dimensional coordinate and pixel value, identify a first set of 2-dimensional coordinates of a first set of pixels from the pixels of the first cross-sectional image, the first set of pixels associated with first pixel values within a predetermined pixel value range, identify a second set of 2-dimensional coordinates of a second set of pixels from the pixels of the second cross-sectional image, the second set of pixels associated with second pixel values within the predetermined pixel value range, generate a first set of hexahedron data representing first hexahedron models, each of the first set of hexahedron data associated with a corresponding hexahedron model from the first hexahedron models at a corresponding coordinate from the first set of 2-dimensional coordinates, generate a second set of hexahedron data representing second hexahedron models, each of the second set of hexahedron data associated with a corresponding hexahedron model from the second hexahedron models at a corresponding coordinate from the second set of 2-dimensional coordinates, and generate the 3-dimensional model data based on the first set of hexahedron data and the second set of hexahedron data. In some embodiments, the first hexahedron models and the second hexahedron models may be cubes.

BRIEF DESCRIPTION OF THE DRAWINGS

Figure (FIG. 1 illustrates an example two dimensional (2-D) computerized tomography scan image.

FIG. 7A illustrates an example conversion of pixels in 2-D images into hexahedron models of a 3-D model, in accordance with an embodiment.

FIG. 10A illustrates an example 3-D model before removing vertexes of hexahedron models shared by three orthogonal surfaces and an example 3-D model after removing the vertexes, according to the computer implemented process shown in FIG. 9.

FIG. 10B illustrates an example approach of determining a vertex of a hexahedron model shared by three orthogonal surfaces, according to the computer implemented process shown in FIG. 9.

FIG. 16 illustrates an example 3-D model before synthesizing lateral surfaces of a 3-D model and an example 3-D model after synthesizing the lateral surfaces, according to the computer implemented process shown in FIG. 15.

DETAILED DESCRIPTION

Figure 1:
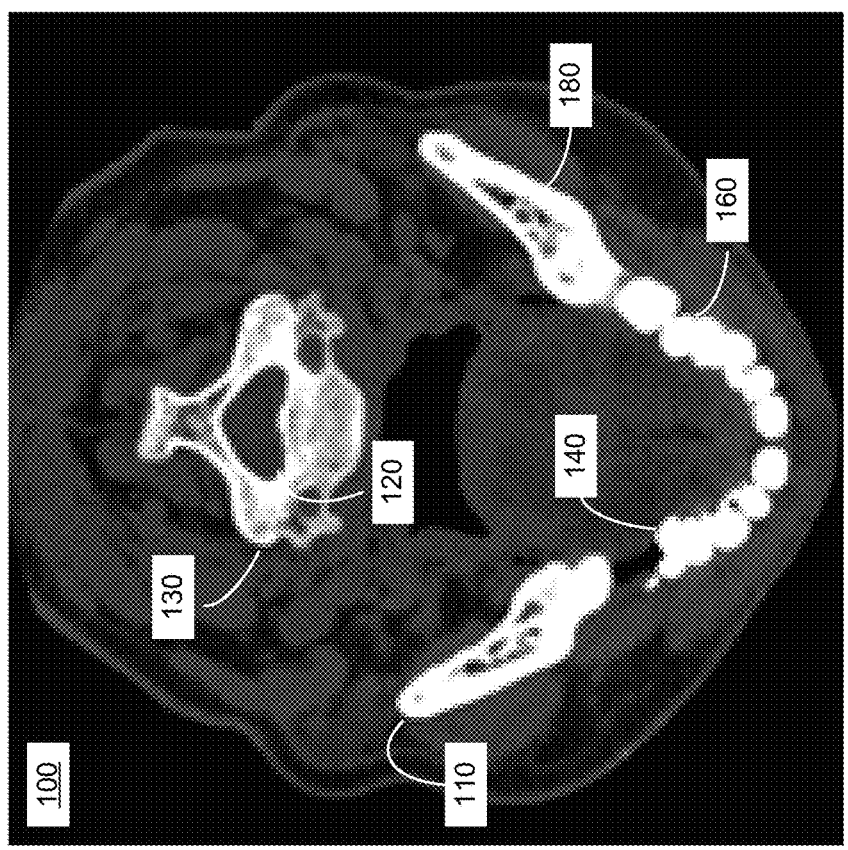
Figure 2:
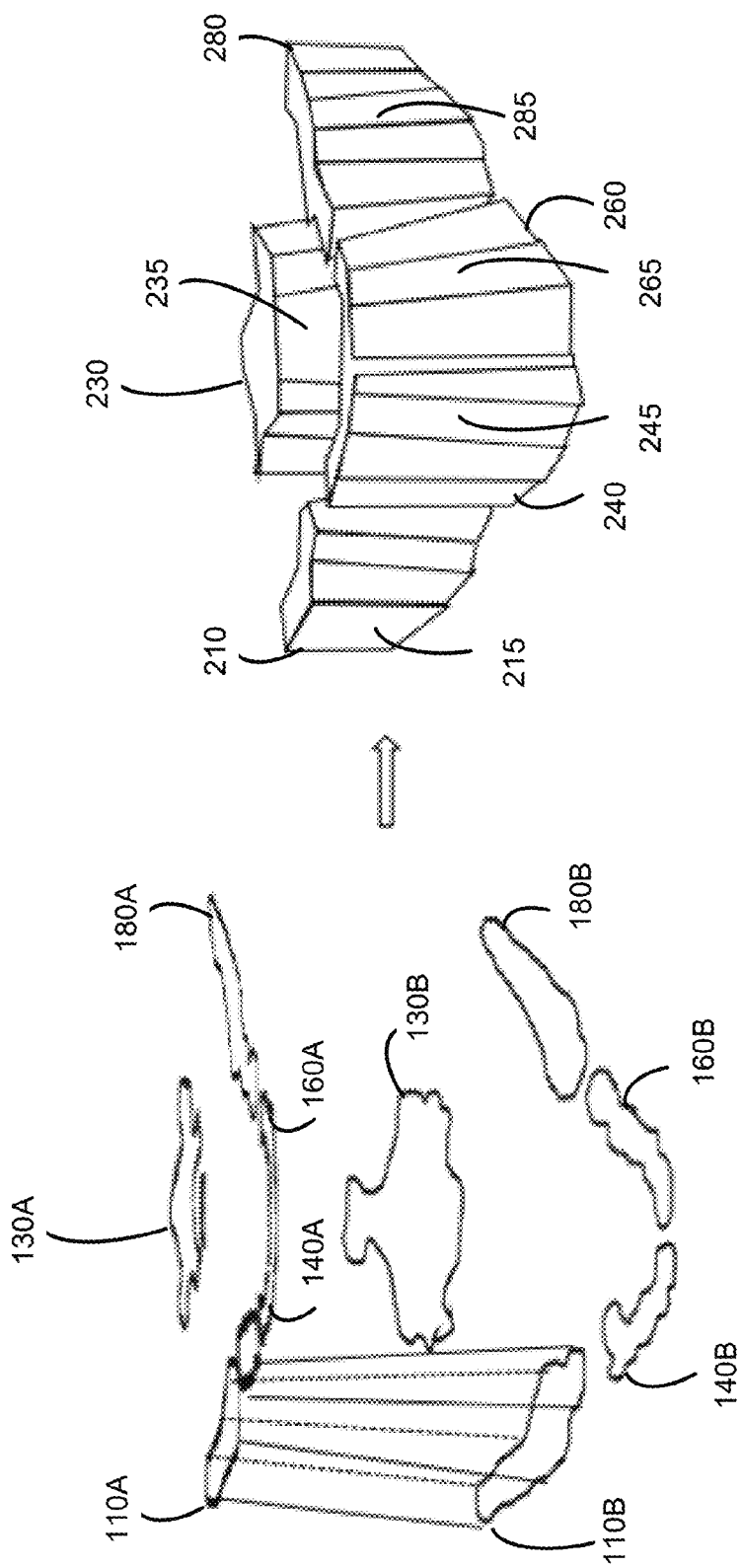
FIGS. 2A and 2B illustrate a computer implemented process of generating a 3-D model based on 2-D images, according to a conventional approach.
Figure 3:
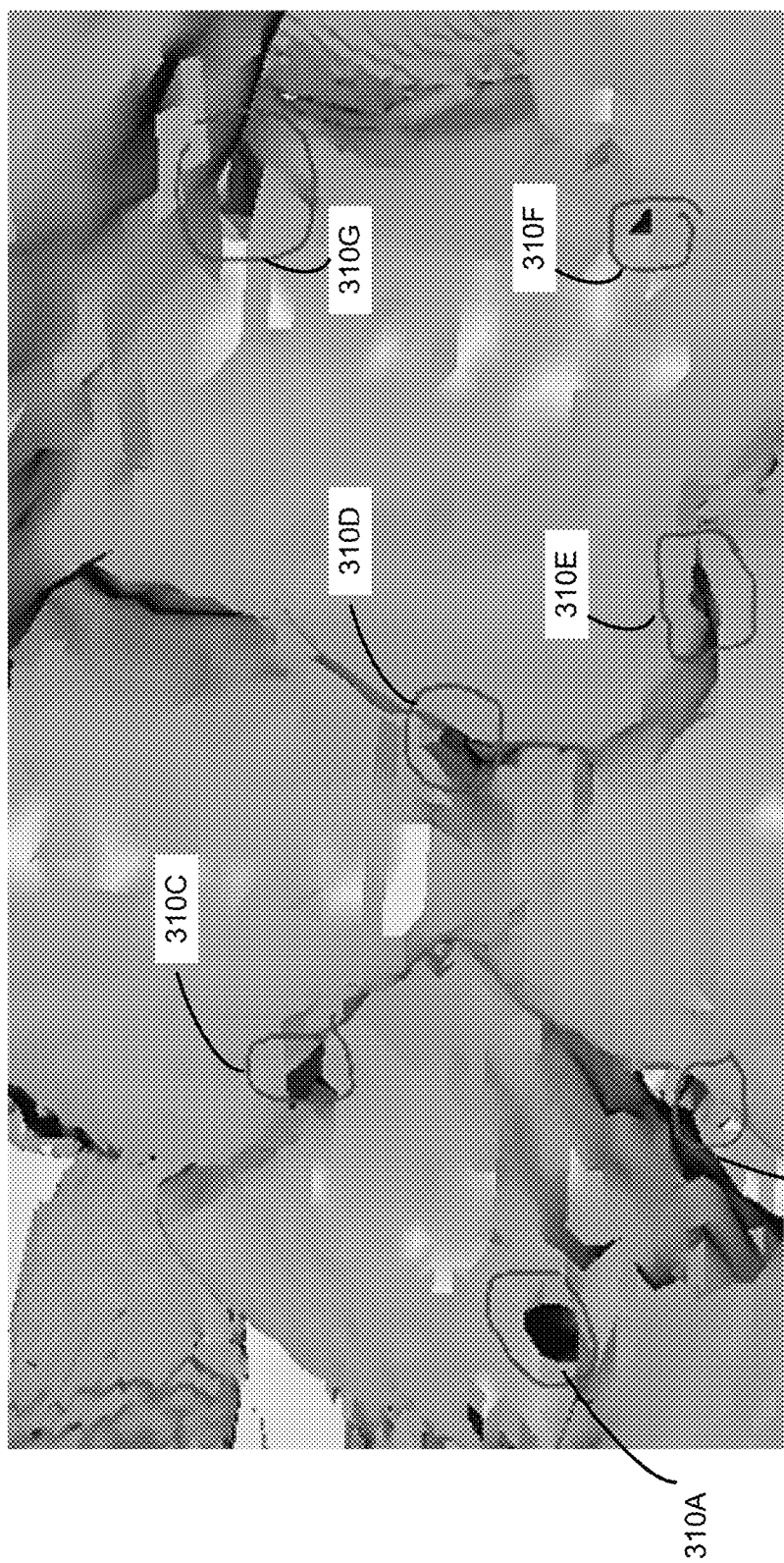
FIG. 3 is an example 3-D model including open shapes generated according to the conventional approach.

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments of disclosed configurations include a computer implemented method (system and non-transitory computer storage readable medium) for generating a virtual 3-D model (herein also referred to as "a 3-D model") of a 3-D object based on a plurality of virtual hexahedron models (herein also referred to as "hexahedron model") generated according to respective pixels in the 2-D cross-sectional images of the 3-D object. A hexahedron model is a computer generated virtual unit component having computerized data that represent a hexahedron shape.

Different cross-sectional images correspond to different locations of the 3-D object along one of 3-D axes. Each cross-sectional image is divided into a plurality of pixels, and a pixel of a 2-D cross-sectional image is identified by a 2-D coordinate and a location of the 2-D cross-sectional image along the one of the 3-D axes. A hexahedron model corresponding to the pixel is generated at a location in a virtual 3-D space corresponding to the 2-D coordinate and the location of the 2-D cross-sectional image along the one of the 3-D axes.

By generating the 3-D model of the 3-D object including the plurality of hexahedron models, where each hexahedron model corresponds to a respective pixel of a 2-D cross-sectional image, objects within another object can be accurately represented. In addition, the 3-D model shall have a closed shape, hence 3-D printing of the 3-D model can be performed successfully.

In one aspect, the 3-D model is represented by a 3-D model data that can be electronically stored or transferred. The 3-D model data herein refer to an electronic representation of the 3-D model having a closed shape. The 3-D model data indicate a structural configuration (e.g., location, shape, size, color, etc.) of components (e.g., vertexes, sides, surfaces, or any combination thereof) of the 3-D model. The 3-D model data can be retrieved by a computing system for generating a visual representation of the 3-D model, or applied to the 3-D printing machine for generating a tangible, physical representation of the 3-D model.

System Overview

Figure 4:
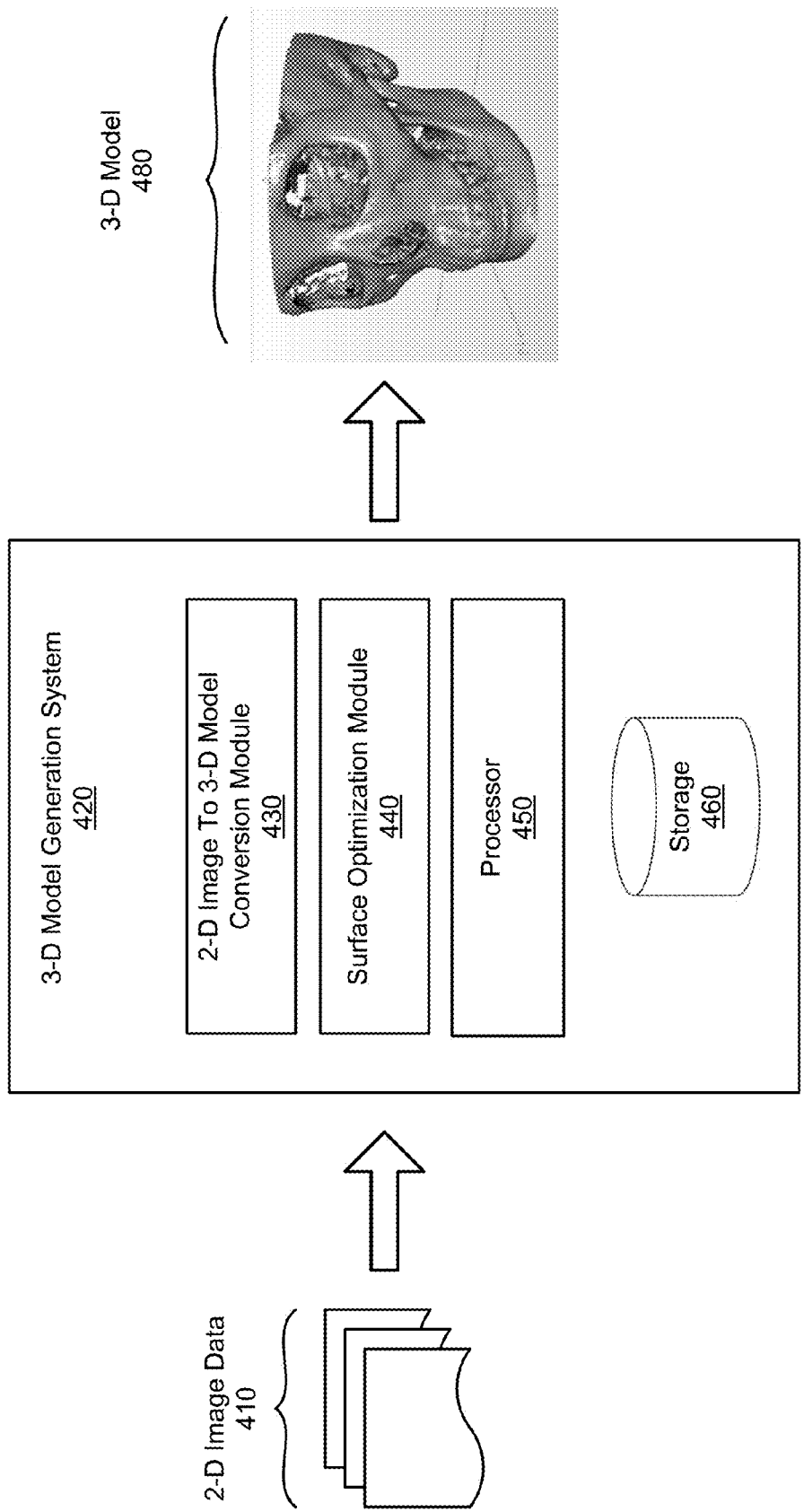
FIG. 4 illustrates an example 3-D model generation system, in accordance with an embodiment.

FIG. 4 illustrates an example 3-D model generation system 420, in accordance with an embodiment. In FIG. 4, the system 420 receives 2-D image data 410 of a 3-D object, and generates a 3-D model 480 of the object. The system 420 generates a virtual 3-D model 480 based on the 2-D image data, and stores 3-D model data (i.e., an electronic representation) of the 3-D model.

The 2-D image data are electronic, computerized representations of 2-D cross-sectional images (e.g., CT scan images, MM scan images, etc.). The 2-D image data are also referred to as "2-D image files". A 2-D image file of a 2-D image includes, for each pixel of the 2-D image, a 2-D coordinate identifying the pixel and a pixel value (e.g., color value) of the pixel. The pixel value represents a color of a pixel identified by a 2-D coordinate. The pixel value may be represented in any color space format (e.g., RGB, YCbCr, etc.). In one embodiment, the 2-D images are cross-sectional images of a 3-D object, where each 2-D image corresponds to a respective 2-D image file. Each 2-D image is separated from another 2-D image along an axis of the 3-D image that is orthogonal to the 2-D images, preferably by a uniform distance. In other words, the 2D image data 410 represent multiple cross sections of a 3-D object, each cross section at different depths of the 3-D object along the axis. For example, a human skull may be represented by dozens or hundreds of 2-D cross sectional images (e.g., CT scans or MRI scans) of the 3-D object, separated by certain distances. Each of the 2-D cross sectional images includes a very large number of pixels, for example, hundreds of thousands or millions, or in some cases even more, pixels, depending on the resolution of the 2-D cross sectional images. Therefore, the 3-D model generation system must be implemented as a computerized system, as the 2-D image to 3-D model conversion according to the embodiments herein involves a very large number of computations of computerized image data.

The system 420 is a computing device for generating 3-D model data. In one embodiment, the system 420 includes a 2-D image to 3-D model conversion module 430 (herein also referred to as "the conversion module 430"), a surface optimization module 440, a processor 450, and a storage 460 storing computerized data such as the 2-D image data or the 3-D model data. In other embodiments, the system 420 includes more or less number of components than shown in FIG. 4. For example, the system 420 may include additional components as described in detail with respect to FIG. 20 below.

The conversion module 430 generates 3-D model data based on 2-D image files. In one embodiment, the conversion module 430 generates a 3-D model including hexahedron models, according to coordinates and pixel values identified in the 2-D image files. The conversion module 430 identifies pixels having pixel values within a predetermined pixel value range, and generates hexahedron models for the identified pixels for each 2-D image file. For example, the conversion module 430 may identify pixels having pixel values within a certain pixel color range that represent a bone of a human being, in order to identify the 3-D object (e.g., bones) represented in the 2-D image files. Each hexahedron model is associated with a corresponding pixel, and is generated at a location corresponding to a coordinate of the corresponding pixel. In one example, a width and a length of a hexahedron model corresponds to a width and a length of a pixel, and a height of the hexahedron model corresponds to a separation between corresponding locations of two 2-D images along an axis orthogonal to the 2-D images. Accordingly, the hexahedron models from different 2-D images can be stacked to form a 3-D model. Example steps of generating a 3-D model based on the 2-D images are provided in detail with respect to FIGS. 6 and 7A through 7F below. The conversion module 430 generates the 3-D model data describing a structural configuration of the 3-D model including hexahedron models, and stores the hexahedron models at the storage 460. In one embodiment, the conversion module 430 is embodied as hardware, software, firmware, or a combination of thereof.

The surface optimization module 440 obtains the 3-D model data generated by the conversion module 430, and automatically performs operations to smoothen virtual surfaces of the 3-D model of the 3-D model data. The 3-D model including hexahedron models having protruding or recessed vertexes may not appear natural or realistic. The surface optimization module 440 modifies the 3-D model data to merge, reposition, remove, or resize surfaces of the 3-D model. In one aspect, each surface of hexahedron models is represented with triangles, and the surfaces of the 3-D model can be smoothened by modifying or transforming triangles. Example steps of smoothening surfaces of the 3-D model data are provided in detail with respect to FIGS. 8 through 19 below. Responsive to smoothening the surfaces of the 3-D model, the surface optimization module 440 stores the modified 3-D model data describing a structural configuration of the 3-D model with smoothened surfaces at the storage 460. In one embodiment, the software optimization module 440 is embodied as hardware, software, firmware, or a combination thereof.

The processor 450 is a processing unit that executes instructions, and may include general purpose computer processors. In some embodiments, the processor 450 can be implemented on a reconfigurable hardware (e.g., a field programmable gate array (FPGA)), or one or more application specific integrated circuits (ASICs). The processor 450 executes instructions for performing functions of the system 420 disclosed herein. In one embodiment, the processor 450 includes multiple processing units, and multiple instructions can be executed in parallel.

The storage 460 is an electronic storage component for storing data. In one embodiment, the storage 460 stores one or instructions for performing functions of software modules (e.g., conversion module 430 and/or surface optimization module 440) of the system 420. In addition, the system 420 can store 2-D image data 410, 3-D model data, etc. The stored data can be accessed by the modules of the system 420 or other components not shown in FIG. 4. For example, an output display module (not shown) obtains the 3-D model data and renders a virtual representation of a 3-D model. For another example, a 3-D printer obtains the 3-D model data and generates a tangible, physical representation of the 3-D model.

Figure 5:
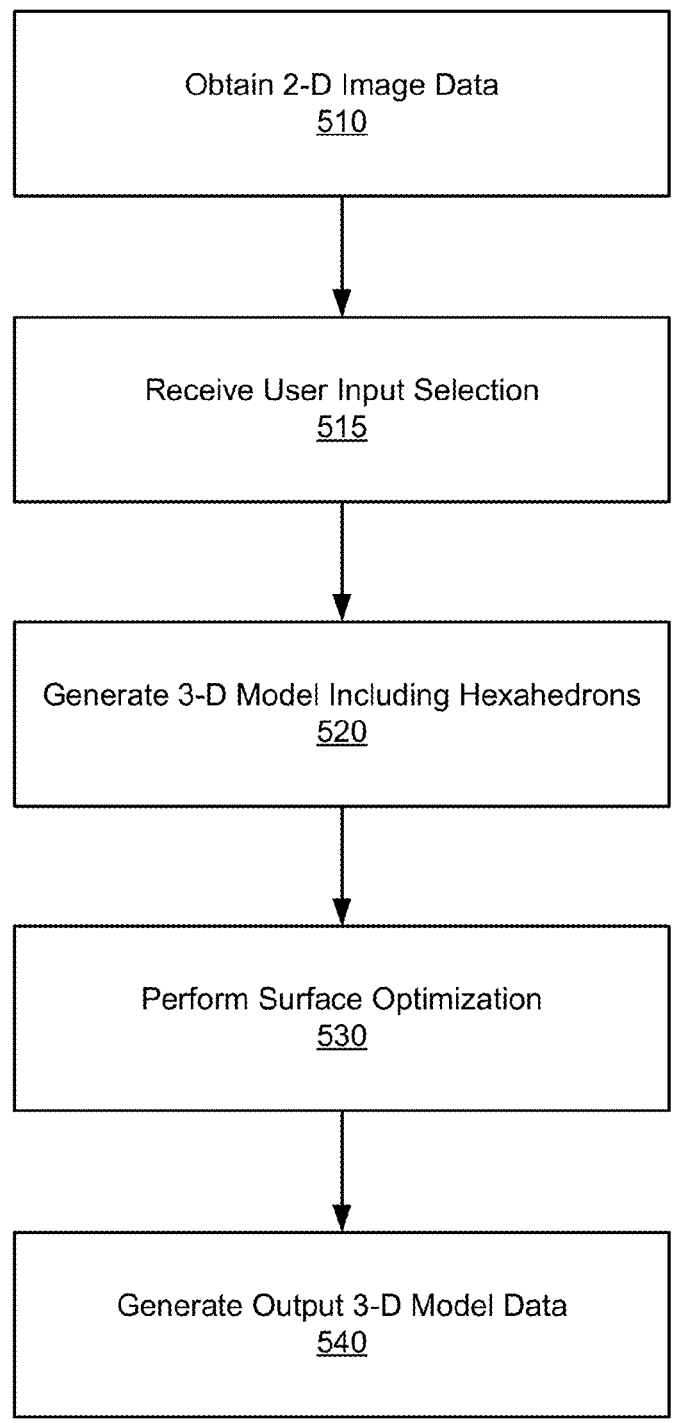
FIG. 5 is a flow chart illustrating a computer implemented process of generating 3-D model data including an electronic representation of a 3-D model based on 2-D image data, in accordance with an embodiment.

FIG. 5 is a flow chart illustrating a computer implemented process of generating 3-D model data including an electronic representation of a 3-D model based on 2-D image data, in accordance with an embodiment. In one embodiment, the steps in FIG. 5 are performed by the system 420 of FIG. 4. Other entities may perform some or all of the steps in other embodiments. Likewise, embodiments may include different and/or additional steps, or perform the steps in different orders.

The system 420 obtains 510 2-D image data. The 2-D image data are electronic representations of 2-D cross-sectional images of a three-dimensional object.

The system 420 receives 515 a user input selection of a pixel value. In one embodiment, the system 420 visually presents one of the 2-D cross-sectional images to a user, and the user may select a pixel value of interest. In one example, the user can select a single pixel value, and the system identifies a range of pixel values from the selected pixel value. The user can select multiple pixel values or multiple ranges of pixel values. In another embodiment, a user selects a component (e.g., tooth of FIG. 1) on the 2-D cross-sectional image presented of interest. In this embodiment, the user selection of the component is identified by a 2-D coordinate of a pixel corresponding to the selected component. The system 420 identifies a pixel value or a range of pixel values of the selected component identified by the 2-D coordinate. The user can select multiple components, and the system 420 identifies multiple pixel values or multiple ranges of pixel values corresponding to the selected components identified by 2-D coordinates.

The system 420 generates 520 3-D models including hexahedron models. Specifically, the system 420 identifies pixels having pixel values within a predetermined pixel value range, and generates hexahedron models for the identified pixels for each 2-D image file. For example, the conversion module 430 may identify pixels having pixel values within a certain pixel color range that represent a bone of a human being, in order to identify the 3-D object (e.g., bones) represented in the 2-D image files and generate the 3-D model. Each hexahedron model is positioned according to coordinates of a corresponding pixel and a location of a 2-D image along an orthogonal axis. Thus, the hexahedron models can be stacked to form a 3-D model having a closed shape.

The system 420 performs 530 surface optimization. In one aspect, the system 420 performs surface optimization to automatically smoothen surfaces of the 3-D model including hexahedron models.

The system 420 generates 540 output 3-D model data. The system 420 generates 3-D model data of the modified 3-D model as the output 3-D model data. The output 3-D model data can be processed by a computing machine to present a visual representation of the 3-D model, or processed by a 3-D printing machine to generate a physical representation of the 3-D model.

Figure 6:
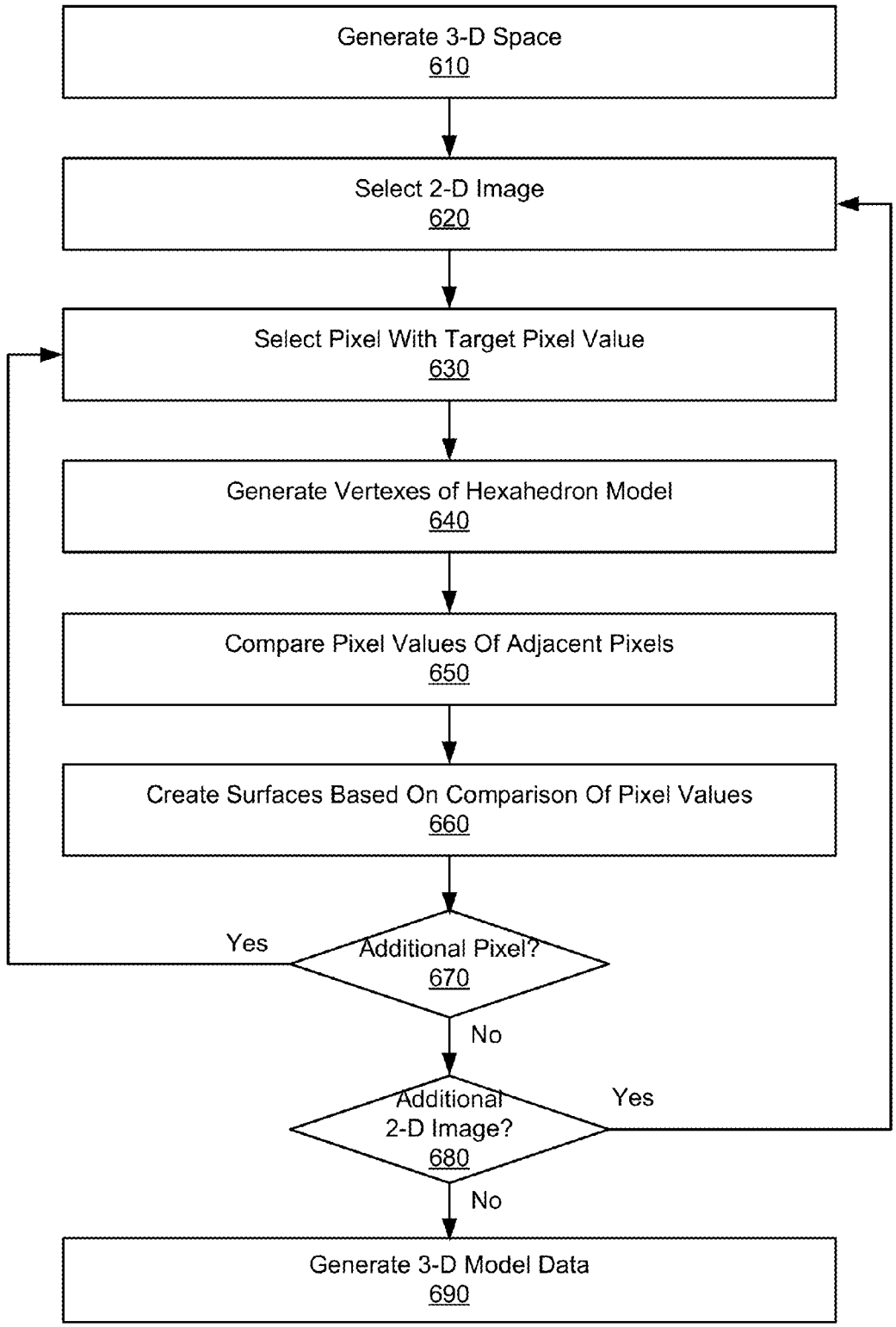
FIG. 6 is a flow chart illustrating a computer implemented process of generating an electronic representation of a 3-D model, in accordance with an embodiment.

FIG. 6 is a flow chart illustrating a computer implemented process of generating an electronic representation of a 3-D model including hexahedron models, in accordance with an embodiment. In one embodiment, the steps in FIG. 6 are part of the step 520 in FIG. 5. Hence, the steps in FIG. 6 are performed by the system 420 of FIG. 4 (e.g., conversion module 430). Other entities may perform some or all of the steps in other embodiments. Likewise, embodiments may include different and/or additional steps, or perform the steps in different orders.

The system 420 generates 610 a virtual 3-D space (herein also referred to as "a 3-D space"). The 3-D space is a virtual space in a computerized graphics system in which a virtual 3-D model can be generated. The system 420 receives 2-D images, and determines a number of pixels in each 2-D image and a number of 2-D images. The system 420 generates a virtual space which can include at least a total number of pixels in the 2-D images and in most cases more pixels. In addition, the system 420 maps 2-D coordinates of 2-D images into corresponding 3-D coordinates of the 3-D space. For example, a pixel identified by a 2-D coordinate (x, y) of a third 2-D image can be mapped to 3-D coordinate (x, y, z), where z represents the depth at which the 2-D image is along the axis of the 3-D object and x and y are the 2-D coordinates of pixel within the 2-D image. Since the system 420 receives multiple sets of 2-D images to generate the 3-D model data according to embodiments herein, the pixels in each of the 2-D images may have different z coordinate data depending on which 2-D image the pixel belongs to. For example, a pixel in one cross-section image at an (x, y) 2-D location may have a 3-D coordinate (x, y, z1), and another pixel in another cross-section image at the same (x, y) 2-D location but at a different depth along an axis of the 3-D object may have a 3-D coordinate (x, y, z2). Hence, a hexahedron model corresponding to a pixel can be generated at a 3-D coordinate corresponding to the 2-D coordinate of the pixel.

The system 420 selects 620 a 2-D image among the multiple sets of 2-D cross-sectional images of the 3-D object. In one aspect, the system 420 selects a 2-D image according to its location along the axis orthogonal to the 2-D image. For example, a 2-D image located at one end (e.g., bottom) of the orthogonal axis is selected first, then a subsequent 2-D image towards another end (e.g., top) at a different depth of the orthogonal axis is selected next.

The system 420 selects 630 a pixel with a target pixel value. Specifically, the system 420 identifies pixels having pixel values within a predetermined pixel value range. In one approach, the predetermined pixel value range is defined by a user of the system 420, or is predefined by the system 420. The system 420 selects a pixel from the identified pixels.

The system 420 generates 640 vertexes of a hexahedron model corresponding to the selected pixel. The system determines sizes (e.g., height, width, and length) and a location of the hexahedron model based on the 2-D coordinates of the pixel, and generates the hexahedron data indicating locations of vertexes of a hexahedron model based on the determined sizes and location of the hexahedron model. In one example, each vertex of the hexahedron model can be identified with a 3-D coordinate in the 3-D space. In some embodiments, the hexahedron model may be cube models.

The system 420 compares 650 a pixel value of the selected pixel with pixel values of adjacent pixels. The adjacent pixels include pixels in the same 2-D image, and pixels in different 2-D images (e.g., above/below the selected pixel). Specifically, the system 420 compares, for each adjacent pixel, whether the adjacent pixel has a pixel value within a predetermined pixel value range. For example, the predetermined pixel value range may correspond to the pixel values (color values) that represent bones of a 3-D object of a human being.

The system 420 generates 660 surfaces of the hexahedron model based on the comparison of the pixel values. In one embodiment, responsive to determining that an adjacent pixel located in a direction has a pixel value within the predetermined pixel value range, the system 420 determines a surface of the hexahedron model facing in the direction to be an open surface. The open surface of the hexahedron model represents that two hexahedron models are adjoined to share the open surface. The adjoined hexahedron models are treated as a single hexahedron model to improve computation efficiency. Responsive to determining that an adjacent pixel located in another direction has a pixel value outside of the predetermined pixel value range, the system 420 determines a surface of the hexahedron model facing in said another direction to be a closed surface. The closed surface of the hexahedron model becomes a part of a surface of a 3-D model to distinguish between an inside and an outside of the 3-D model. In one aspect, the closed surface has a color corresponding to the pixel value of the selected pixel or an average of the predetermined pixel value range.

The system 420 generates hexahedron data indicating locations of the vertexes of the closed surfaces and a color of the closed surface. In one embodiment, each closed surface of the hexahedron model is divided into two triangles, and the system 420 stores the hexahedron data including locations of vertexes of each triangle. By dividing the surface of hexahedron model into two triangles, surface optimization can be performed to modify a rectangular or square surface of a hexahedron model into any arbitrary polygon including one or more triangles.

The system 420 determines 670 whether a hexahedron model needs to be generated for an additional pixel of the 2-D image having a pixel value within the predetermined pixel value range. Responsive to determining that an additional hexahedron model needs to be generated for the 2-D image, the system 420 proceeds to step 630 to select another pixel and repeats steps 640 to 660. Responsive to determining that all hexahedron models are generated for the 2-D image, the system 420 determines 680 whether an additional 2-D image exists. If an additional 2-D image exists, the system 420 proceeds to step 620 and select a next 2-D image (e.g., a subsequent image towards said another end of the orthogonal axis) and repeats steps 630 to 670.

After processing all the 2-D images, the 3-D model is generated based on hexahedron models. The 3-D model is a collection of hexahedron models stacked according to 3-D coordinates in the 3-D space. The surface of the 3-D model is represented as closed surfaces of the hexahedron models. The system 420 generates 3-D model data comprising hexahedron data.

In the process disclosed in FIG. 6, closed surfaces and open surfaces of a hexahedron model can be generated for a pixel through the steps 650 and 660. In other embodiments, the steps 650 and 660 can be omitted. For example, hexahedron models each entirely surrounded by closed surfaces can be generated for pixels with pixel values within the predetermined pixel value range, then adjacent hexahedron models can be merged to remove shared surfaces or replace the shared surfaces with open surfaces.

FIG. 7A illustrates an example conversion of pixels in 2-D images 710 into a virtual 3-D model 722 including virtual hexahedron models, in accordance with an embodiment. The system 420 receives 2-D image data (or 2-D image files) that are computerized representations of 2-D cross-sectional images and generates 3-D model data that are electronic representation of the 3-D model. The 2-D images 710 are cross-sectional images of a 3-D object, where each 2-D image is separated from another 2-D image along an axis 700 orthogonal to the 2-D images 710. Each 2-D image is divided into pixels 712, and each pixel is identified by a 2-D coordinate (by a row 716 and a column 714). For example, a high resolution 2-D image includes 1080 by 720 pixels (over 700,000 pixels per image). A location of a 2-D image 710 along the orthogonal axis 700 enables a pixel in a 2-D image 710 to be identified with another dimension.

The system generates the 3-D model 722 including hexahedron models in a 3-D space 720, where each hexahedron model is generated according to a location of a corresponding pixel. The 3-D space is generated according to a number of total pixels in the 2-D images 710. Assuming 30 of high resolution 2-D images 710 (e.g., 1080×720 pixels for each image) are available, a 3-D space 720 can be generated to encompass more than 23 million hexahedron models, thus a high resolution 3-D model 722 can be generated. In one example, a row 716 corresponds to a width 724 of the 3-D space 720, a column 714 corresponds to a length 726 of the 3-D space 720, and the location of the 2-D image 710 along the orthogonal axis 700 corresponds to a height 728 of the 3-D space 720. Thus, pixels in a first image correspond to hexahedron models in a first layer, and pixels in a second image along the axis 700 after the first image correspond to a hexahedron model in a second layer above the first layer along the axis 705 in the 3-D space 720. Therefore, a pixel represented in 2-D coordinate can be mapped to a 3-D coordinate, and a hexahedron model can be generated at a 3-D coordinate corresponding to the 2-D coordinate of a pixel in a 2-D image.

In one embodiment, the system 420 receives a first set of image data representing the first image, and generates a first set of hexahedron data representing first hexahedron models based on the first set of image data. Similarly, the system 420 receives a second set of image data representing the second image after the first image along the axis 700, and generates a second set of hexahedron data representing second hexahedron models stacked on top of the first hexahedron models along the axis 705 based on the second set of image data. The system 420 obtains additional image data representing additional images along the axis 700, and generates additional hexahedron data representing additional hexahedron models at corresponding levels (or layers) along the axis 705.

Figure 7C:
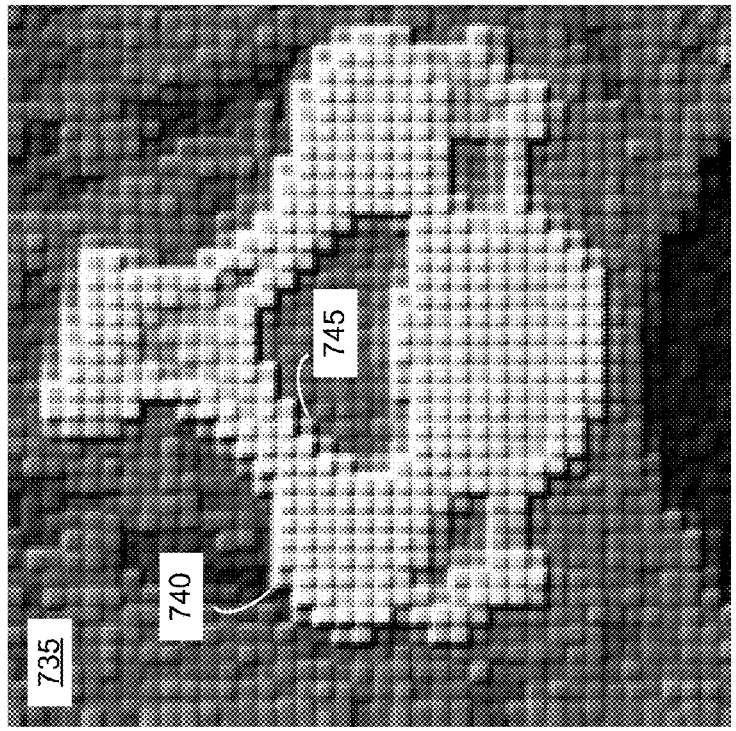
FIG. 7C is a blown up diagram of a portion of the cross-section of the 3-D model shown in FIG. 7B, in accordance with an embodiment.
Figure 7B:
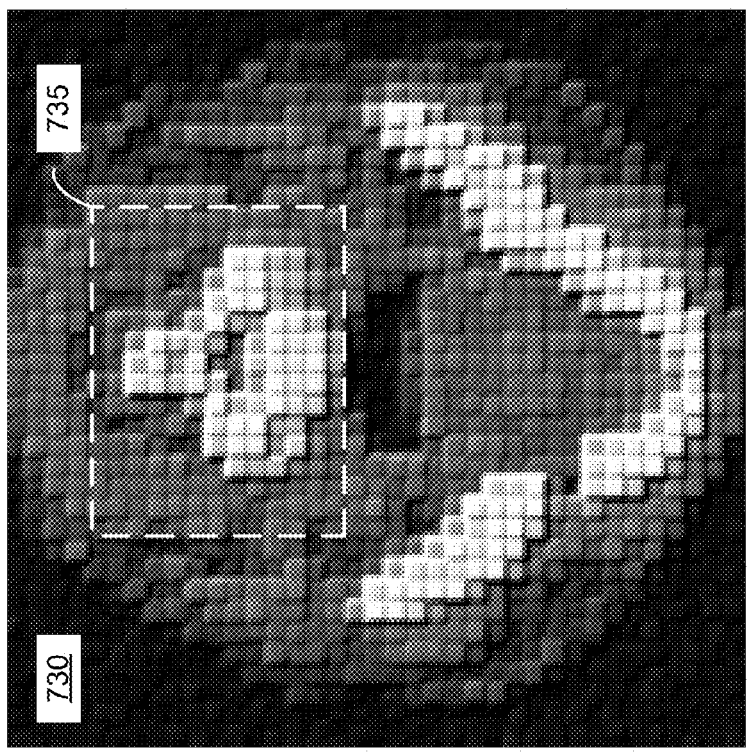
FIG. 7B illustrates an example cross-section of a 3-D model corresponding to the CT scan image of FIG. 1, in accordance with an embodiment.

FIG. 7B illustrates an example cross-section 730 of a 3-D model corresponding to the CT scan image of FIG. 1, in accordance with an embodiment. In the cross-section 730, hexahedron models are generated at locations of corresponding pixels. As a result, objects within another object can be accurately represented as shown in FIG. 7B. FIG. 7C is an expanded diagram of a portion 735 of FIG. 7B, illustrating that an internal object 745 (e.g., vertebral foramen) corresponding to an object 120 of FIG. 1 within another object 740 (e.g., vertebra) corresponding to another object 130 of FIG. 1 is accurately represented.

Figure 7D:
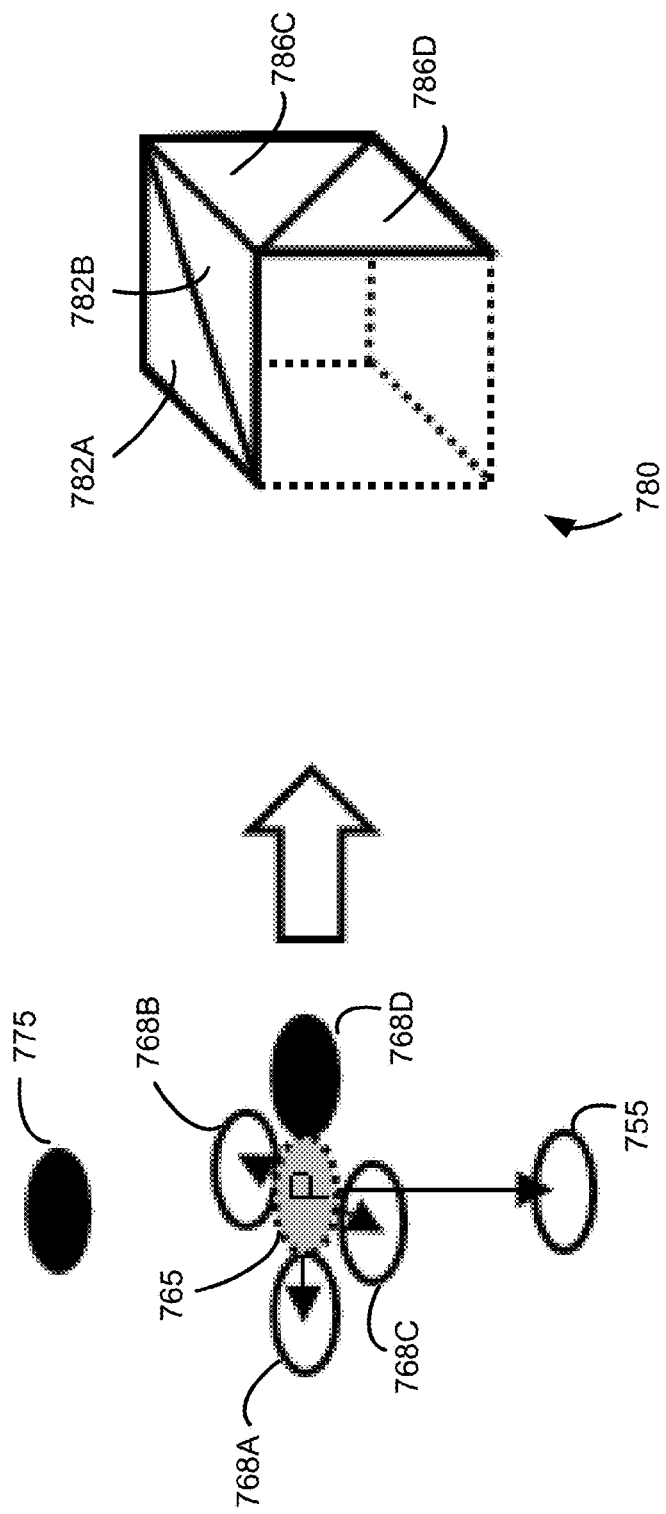
FIG. 7D illustrates an example process of generating a hexahedron model for a pixel, in accordance with an embodiment.

FIG. 7D illustrates an example process of generating a hexahedron model for a pixel, in accordance with an embodiment. For example, the system 420 selects a pixel P to generate a hexahedron model 780. The system 420 determines that adjacent pixels 768A, 768B, 768C in a same 2-D image have pixel values within the predetermined pixel value range, but determines that an adjacent pixel 768D has a pixel value outside of the predetermined pixel value range. Hence, the system 420 generates surface information describing a structural configuration (e.g., location of vertexes, color of a surface, etc.) of a closed surface 786 (786C, 786D) of the hexahedron model 780 towards pixel 768D with a pixel value outside of the predetermined pixel value range. In one aspect, the closed surface 786 is divided into two triangles 786C and 786D. The system 420 also determines that an adjacent pixel 755 of a 2-D image below the pixel P has a pixel value within the predetermined pixel value range, but determines that an adjacent pixel 775 of a 2-D image above the pixel P has a pixel value outside of the predetermined pixel value range. Thus, the system 420 generates (or updates) the surface information of the hexahedron model 780 to include a structural configuration of a closed surface 782 (782A, 782B) towards pixel 775 with a pixel value outside of the predetermined pixel value range. The closed surface 782 may be also divided into two triangles 782A and 782B. The hexahedron model 780 does not have closed surfaces, but rather has open surfaces, towards pixels with pixel values within the predetermined pixel value range, for example, toward pixels 768A, 768B, 768C, 755. In other words, the remaining surfaces of the hexahedron model 780 other than the closed surfaces 782, 786 are determined to be open surfaces, because adjacent hexahedron models would share these open surfaces. By repeating the process as described in FIG. 7D (and FIG. 6) for all the pixels in each of the 2-D cross sectional images at different depths of the orthogonal axis of the 3-D space, i.e., defining hexahedrons with closed or open surfaces and adjoining such hexahedrons corresponding to different ones of the 2-D cross sectional images, a 3-D model made up of hexahedron models corresponding to the 3-D object may be generated.

Figure 7F:
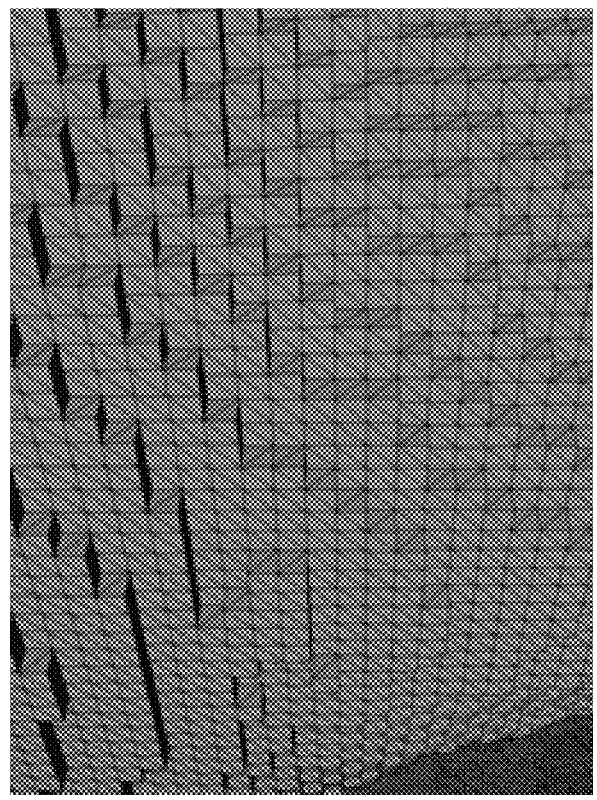
FIG. 7F is an expanded diagram of a portion of the 3-D model shown in FIG. 7E, in accordance with an embodiment.
Figure 7E:
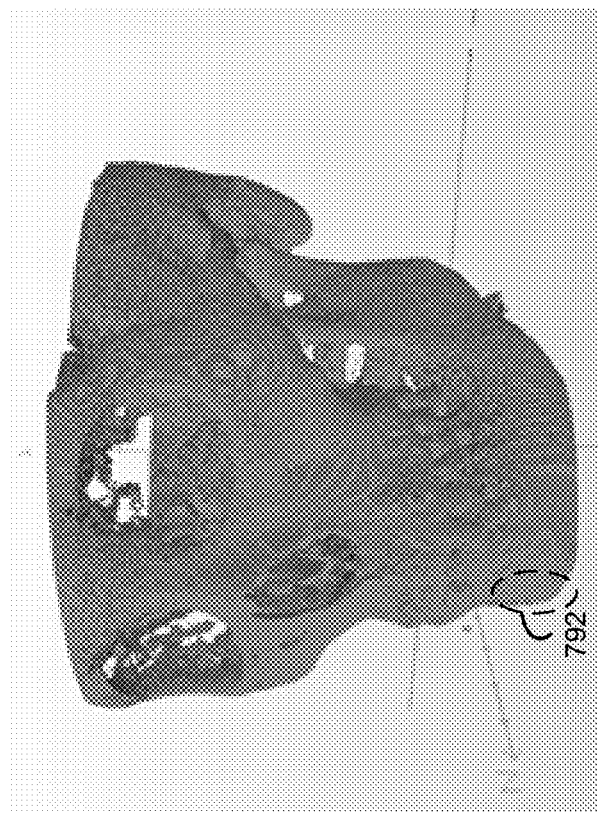
FIG. 7E illustrates an example 3-D model including a plurality of hexahedron models, in accordance with an embodiment.

FIG. 7E illustrates an example 3-D model 790 including a plurality of hexahedron models, in accordance with an embodiment. The system 420 generates the 3-D model of a human skull represented with a plurality of hexahedron models based on 2-D images. FIG. 7F is an expanded diagram of a portion 792 of the 3-D model shown in FIG. 7E to illustrate hexahedron models of the 3-D model. Because each hexahedron model has a closed shape, the 3-D model is also guaranteed to have a closed shape.

Figure 8:
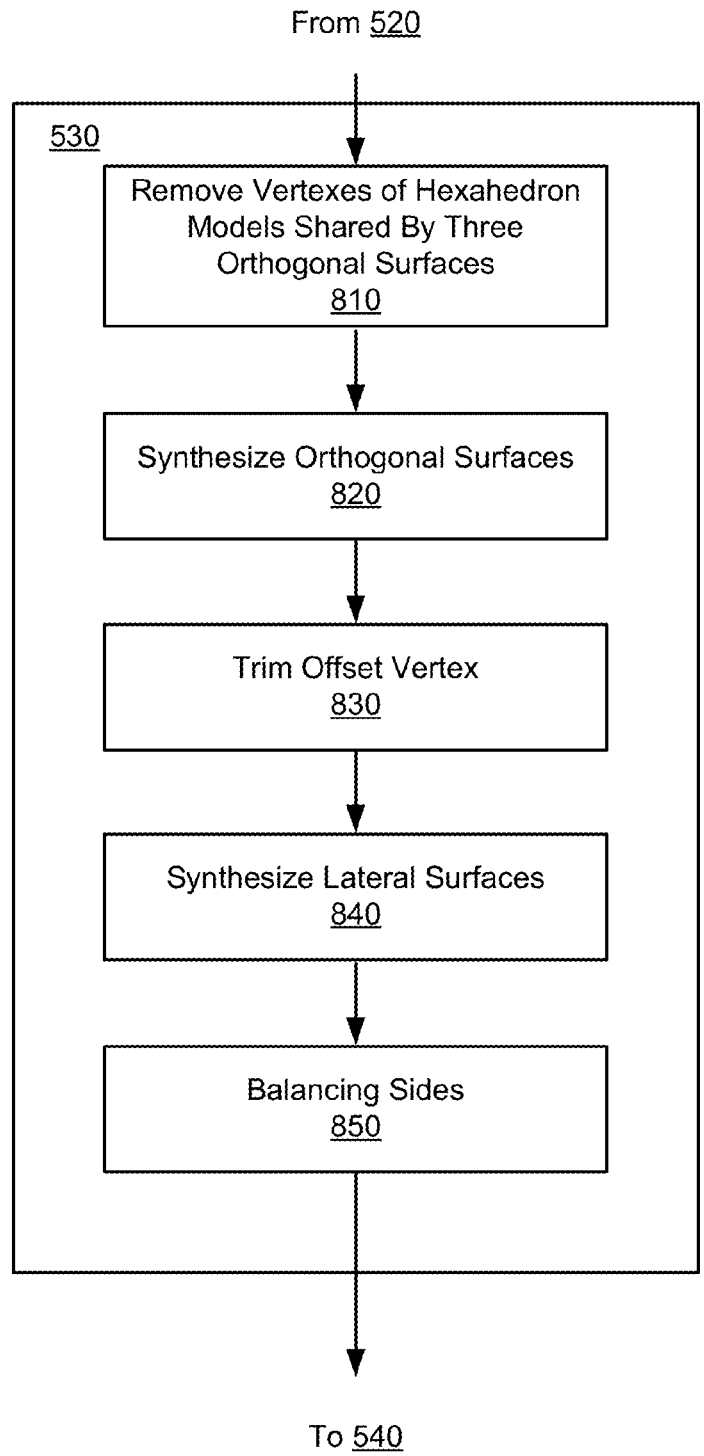
FIG. 8 is a flow chart illustrating a computer implemented process of performing surface optimization on a 3-D model, in accordance with an embodiment.

FIG. 8 is a flow chart illustrating a computer implemented process of performing surface optimization on a 3-D model, in accordance with an embodiment. The 3-D model including hexahedron models include rough or bumpy surfaces, because of protruding or recessed vertexes of hexahedron models, as shown in FIGS. 7E and 7F. In one embodiment, the steps in FIG. 8 are part of the step 530 in FIG. 5. Hence, the steps in FIG. 8 are performed by the system 420 of FIG. 4 (e.g., surface optimization module 440). Other entities may perform some or all of the steps in other embodiments. Likewise, embodiments may include different and/or additional steps, or perform the steps in different orders.

In one embodiment, the system 420 receives 3-D model data describing 3-D model including hexahedron models from the step 520 of FIG. 5. Based on the 3-D model data, the system 420 removes 810 one or more vertexes of hexahedron models, where each vertex is shared by three orthogonal surfaces (e.g., three orthogonal triangles). Orthogonal surfaces herein refer to surfaces with two normal vectors substantially orthogonal to each other. In addition, the system 420 synthesizes 820 orthogonal surfaces of the hexahedron models. The system 420 trims 830 offset vertexes of any polyhedrons (e.g., protruding vertexes or recessed vertexes of polyhedrons from nearby surfaces). The system 420 synthesizes 840 lateral surfaces of the 3-D model. The lateral surfaces herein refer to surfaces (i.e., surfaces facing outside of the 3-D model) having substantially similar orientations. The system 420 balances 850 sides of the surfaces (e.g., sides of triangles). The system 420 generates the 3-D model data describing structural configuration of the modified 3-D model. Example processes of these steps are provided in detail with respect to FIGS. 9 through 18 below.

In other embodiments, some of the steps shown in FIG. 8 may be performed in a different order. In one example, the step 830 may be performed before the step 820, or the step 840 may be performed before the step 830. However, by performing surface optimization in a sequence as shown in FIG. 8, computing resources can be conserved and processing efficiency can be improved. For example, trimming offset vertexes before synthesizing orthogonal surfaces involves more number of vertexes to be trimmed compared to trimming offset vertexes after synthesizing orthogonal surfaces. Similarly, synthesizing lateral surfaces before trimming offset vertexes involves more number of surfaces to be synthesized compared to synthesizing lateral surfaces after trimming offset vertexes.

Figure 9:
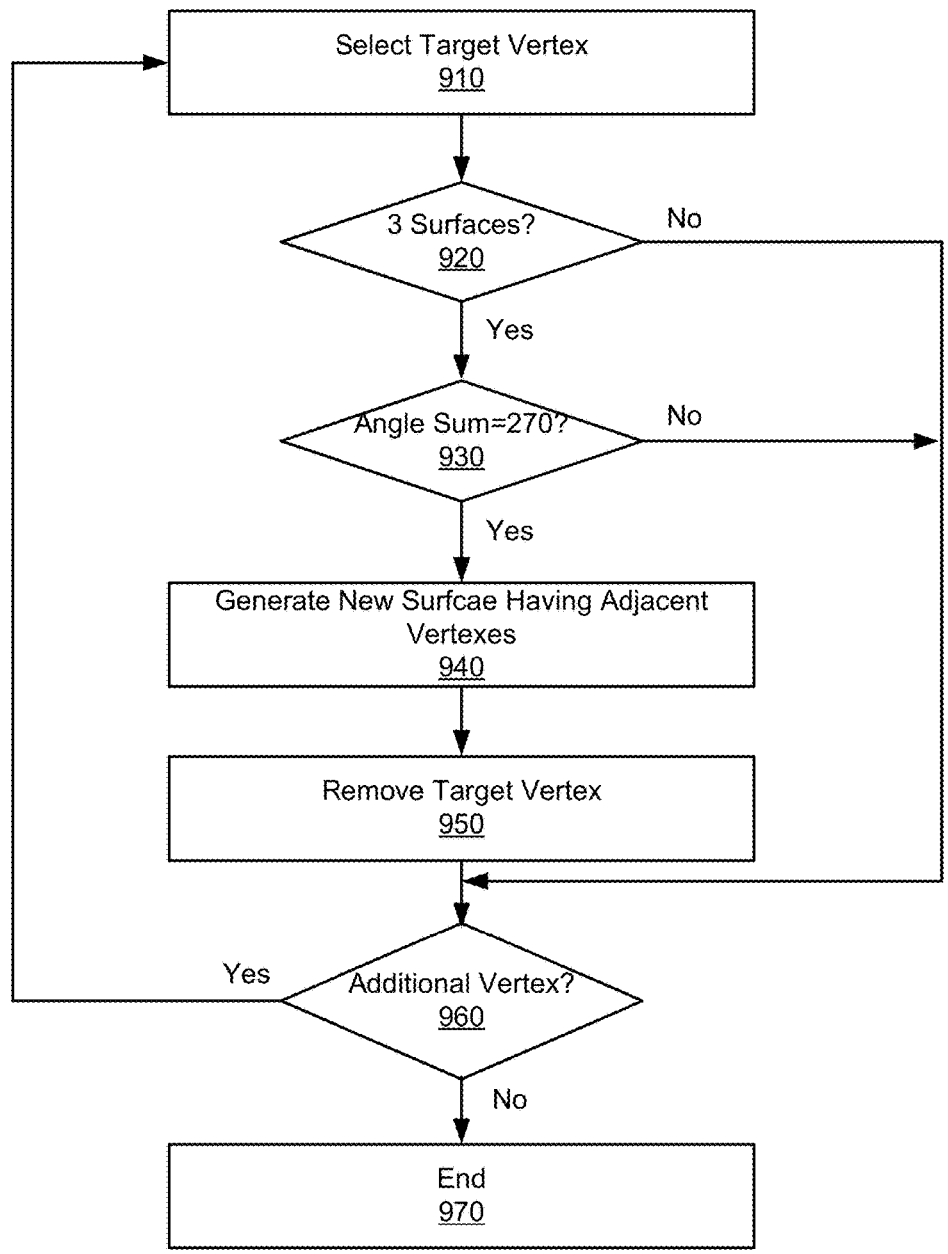
FIG. 9 is a flow chart illustrating a computer implemented process of removing vertexes of hexahedron models shared by three orthogonal surfaces, in accordance with an embodiment.

FIG. 9 is a flow chart illustrating a computer implemented process of removing vertexes of hexahedron models shared by three orthogonal surfaces, in accordance with an embodiment. In one embodiment, the steps in FIG. 9 are part of the step 810 in FIG. 8. Hence, the steps in FIG. 9 are performed by the system 420 of FIG. 4 (e.g., surface optimization module 440). Other entities may perform some or all of the steps in other embodiments. Likewise, embodiments may include different and/or additional steps, or perform the steps in different orders.

The system 420 selects 910 a target vertex from a plurality of vertexes of the 3-D model including hexahedron models. The system 420 determines 920 whether the target vertex is shared by three surfaces (e.g., triangles). Responsive to determining that the target vertex is shared by the three surfaces, the system 420 determines threes angles, where each of the three angles is an angle between two normal vectors of two of the three surfaces. If a sum of the three angles is substantially equal to 270 degrees, the system 420 determines the target vertex is a vertex to be removed, and generates 940 a new surface having adjacent vertexes of the target vertex as its vertexes. The system 420 removes 950 the target vertex and surfaces coupled to the target vertex.

Responsive to determining that the target vertex is not shared by the three surfaces in step 920 or the sum of the three angles is not substantially equal to 270 degrees in step 930, the system 420 proceeds to step 960.

The system 420 determines 960 whether an additional vertex needs to be examined. Responsive to determining that an additional vertex needs to be examined, the system 420 proceeds to step 910 and selects another target vertex from the plurality of vertexes of the 3-D model. If all vertexes are examined, the system 420 ends 970 the process of removing vertexes of hexahedron models shared by three orthogonal surfaces.

FIG. 10A illustrates an example 3-D model 1010 before removing vertexes of hexahedron models and an example 3-D model 1050 after removing vertexes of the hexahedron models, according to the computer implemented process shown in FIG. 9.

In FIG. 10A, the 3-D model 1010 includes hexahedron models including a plurality of vertexes. The system 420 determines vertexes 1020A, 1020B, 1020C, 1020D are to be removed, because each of these vertexes is shared by three orthogonal surfaces. The system 420 also determines that vertexes 1030A, 1030B, 1030D are adjacent vertexes of the vertex 1020A; vertexes 1030E, 1030D, 1030F are adjacent vertexes of the vertex 1020B; vertexes 1030D, 1030F, 1030G are adjacent vertexes of the vertex 1020C; and vertexes 1030D, 1030H, 1030G are adjacent vertexes of the vertex 1020D. Accordingly, the system 420 generates a first triangle S1 having adjacent vertexes 1030A, 1030B, 1030D as its vertexes, a second triangle S2 having adjacent vertexes 1030E, 1030D, 1030F as its vertexes, a third triangle S3 having adjacent vertexes 1030D, 1030F, 1030G as its vertexes, and a fourth triangle S4 having adjacent vertexes 1030D, 1030H, 1030G as its vertexes. Moreover, the system 420 removes triangles (not explicitly shown in FIG. 10A for simplicity) coupled to the vertexes 1020A, 1020B, 1020C, 1020D, respectively and also removes the vertexes 1020A, 1020B, 1020D, 1020D.

FIG. 10B illustrates an example approach of determining a vertex of a hexahedron model to be removed, according to the computer implemented process shown in FIG. 9. In the example shown in FIG. 10B, the vertex 1020C is determined to be a vertex to be removed. The system 420 obtains a first normal vector N1 of a triangle T1 having vertexes 1030D, 1030F, 1020C, a second normal vector N2 of a triangle T2 having vertexes 1020C, 1030F, 1030G, and a third normal vector N3 of a triangle T3 having vertexes 1030D, 1020C, 1030G. In addition, the system 420 obtains an angle θ1 between the first normal vector N1 and the second normal vector N2, an angle θ2 between the second normal vector N2 and the third normal vector N3, and an angle θ3 between the first normal vector N1 and the third normal vector N3. The system 420 adds the angles θ1, θ2, θ3, and determines that the vertex 1020C needs to be removed, because a sum of the angles θ1, θ2, θ3 is 270 degrees. Similar steps can be performed for the vertexes 1020A, 1020B, 1020D. Through the process disclosed in FIG. 9, protruding vertexes (e.g., vertexes 1020A, 1020B, 1020D) as well as recessed vertexes (e.g., vertex 1020C) can be removed to smoothen surfaces of the 3-D model.

Figure 10C:
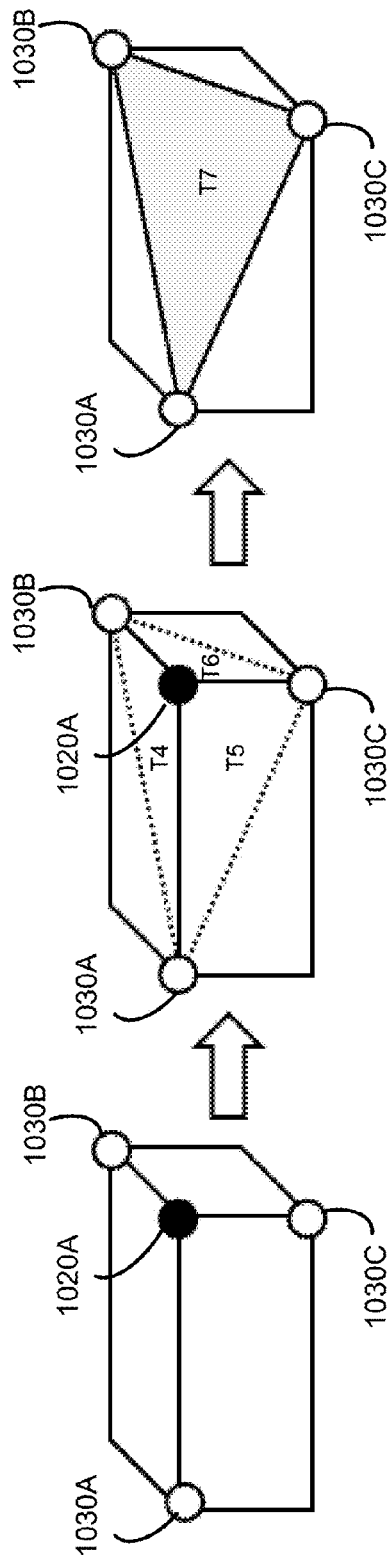
FIG. 10C illustrates an example process of removing a vertex of a hexahedron model shared by three orthogonal surfaces, according to the computer implemented process shown in FIG. 9.

FIG. 10C illustrates an example process of removing a vertex of a hexahedron model shared by three orthogonal surfaces, according to the computer implemented process shown in FIG. 9. The hexahedron model includes the vertex 1020A, and the adjacent vertexes 1030A, 1030B, 1030C of the vertex 1020A. The system 420 determines the vertex 1020A needs to be removed, because the vertex 1020A is shared by three orthogonal triangles T4, T5, T6. The system 420 generates a new triangle T7 having the adjacent vertexes 1030A, 1030B, 1030C as its vertexes. In addition, the system 420 removes the triangles T4, T5, T6, and the vertex 1020A.

Figure 11:
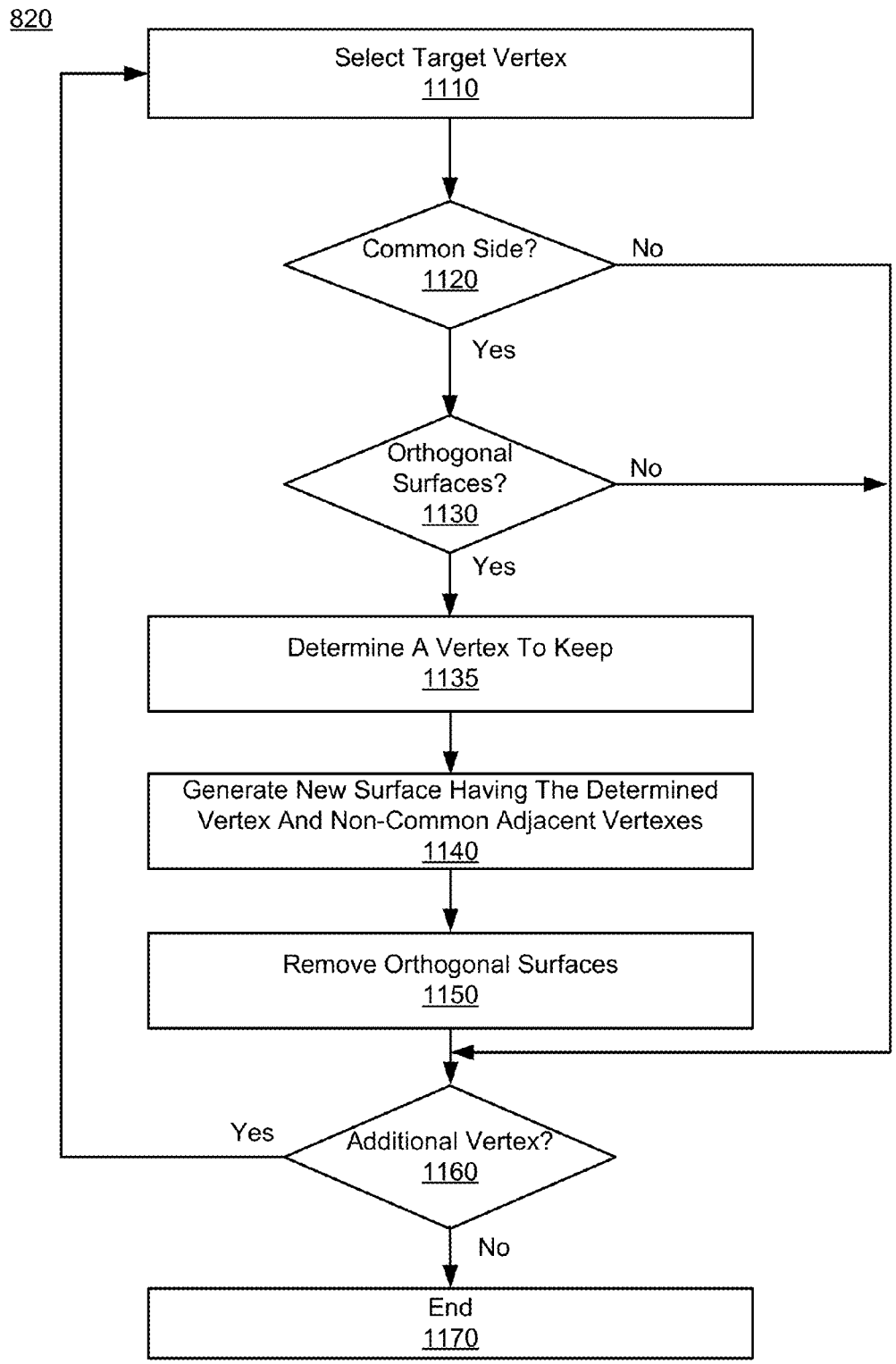
FIG. 11 is a flow chart illustrating a computer implemented process of synthesizing orthogonal surfaces of a 3-D model, in accordance with an embodiment.

FIG. 11 is a flow chart illustrating a computer implemented process of synthesizing orthogonal surfaces of a 3-D model, in accordance with an embodiment. In one embodiment, the steps in FIG. 11 are part of the step 820 in FIG. 8. Hence, the steps in FIG. 11 are performed by the system 420 of FIG. 4 (e.g., surface optimization module 440). Other entities may perform some or all of the steps in other embodiments. Likewise, embodiments may include different and/or additional steps, or perform the steps in different orders.

The system 420 selects 1110 a target vertex from a plurality of vertexes of the 3-D model. The system 420 determines 1120 whether a side having one end as the target vertex and another end as an adjacent vertex of the target vertex is shared by two surfaces (e.g., triangles). Responsive to determining that the side is shared by two surfaces, the system 420 determines 1120 whether the two surfaces sharing the common side are orthogonal to each other. Responsive to determining that the two surfaces sharing the common side are orthogonal to each other, the system 420 determines 1135 which vertex from the target vertex and the adjacent vertex to keep and which vertex to remove. In one aspect, the system 420 determines to keep a vertex shared by more number of surfaces and to remove the other vertex.

The system 420 generates 1140 a new surface having the determined vertex to keep and non-common adjacent vertexes (i.e., adjacent vertexes away from the common side) as its vertexes. Thus, the new surface does not include the other vertex to remove as its vertexes. The system 420 removes the orthogonal surfaces 1150 and the other vertex determined to be removed.

Responsive to determining that there is no common side having one end as the target vertex shared by two surfaces in step 1120 or determining that two surfaces sharing the common side are not orthogonal to each other in step 1130, the system 420 proceeds to step 1160.

The system 420 determines 1160 whether an additional vertex needs to be examined. Responsive to determining that an additional vertex needs to be examined, the system 420 proceeds to step 1110 and selects another target vertex from the plurality of vertexes of the 3-D model. If all vertexes are examined, the system 420 ends 1170 the process of synthesizing orthogonal surfaces of the 3-D model.

Figure 12:
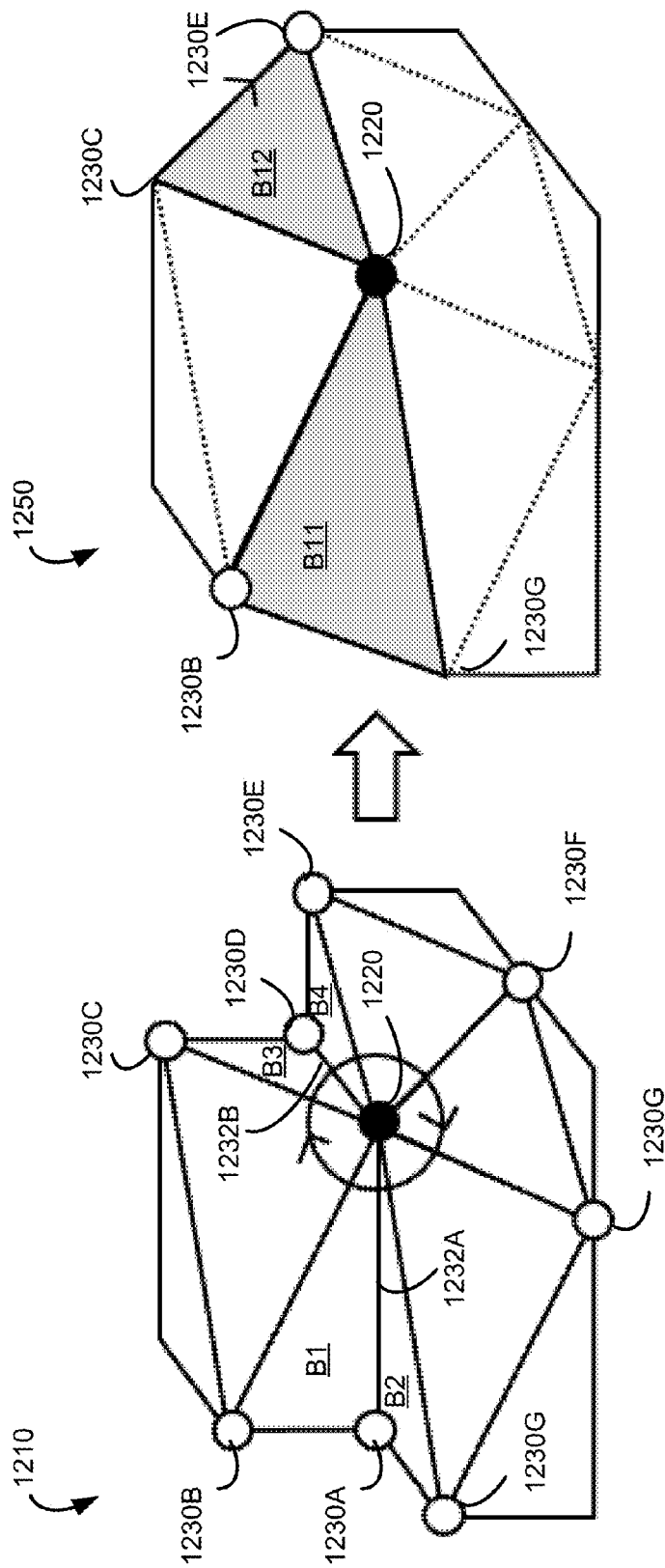
FIG. 12 illustrates an example 3-D model before synthesizing orthogonal surfaces of the 3-D model and an example 3-D model after synthesizing the orthogonal surfaces according to the computer implemented process shown in FIG. 11.

FIG. 12 illustrates an example 3-D model 1210 before synthesizing orthogonal surfaces of the 3-D model 1210 and an example 3-D model 1250 after synthesizing the orthogonal surfaces according to the computer implemented process shown in FIG. 11. In one embodiment, the 3-D model 1210 is obtained after removing vertexes of hexahedron models shared by three orthogonal surfaces as shown in FIGS. 9, 10A and 10B.

In FIG. 12, the 3-D model 1210 includes a vertex 1220 and its adjacent vertexes 1230A, 1230B . . . 1230G (herein also referred to as "an adjacent vertex 1230"). The system 420 determines that a first side 1232A having two vertexes 1230A and 1220 as two ends needs to be removed, because the first side 1232A is shared by two triangles B1, B2 that are orthogonal to each other. Additionally, the system 420 determines that the vertex 1230A of the first side 1232A needs to be removed and the vertex 1220 needs to be kept, because the vertex 1220 is shared by more number of triangles than the vertex 1230A. Similarly, the system 420 determines that a second side 1232B having two vertexes 1230D and 1220 as two ends needs to be removed, because the second side 1232B is shared by two triangles B3, B4 that are orthogonal to each other. Additionally, the system 420 determines that the vertex 1230D of the second side 1232B needs to be removed and the vertex 1220 needs to be kept, because the vertex 1220 is shared by more number of triangles than the vertex 1230D. The system generates a first triangle B11 having the vertexes 1220, 1230B, 1230G as its vertexes, and a second triangles B12 having the vertexes 1220, 1230C, 1230E. Moreover, the system 420 removes the triangles B1, B2, B3, B4 and the vertexes 1230A and 1230D.

Figure 13:
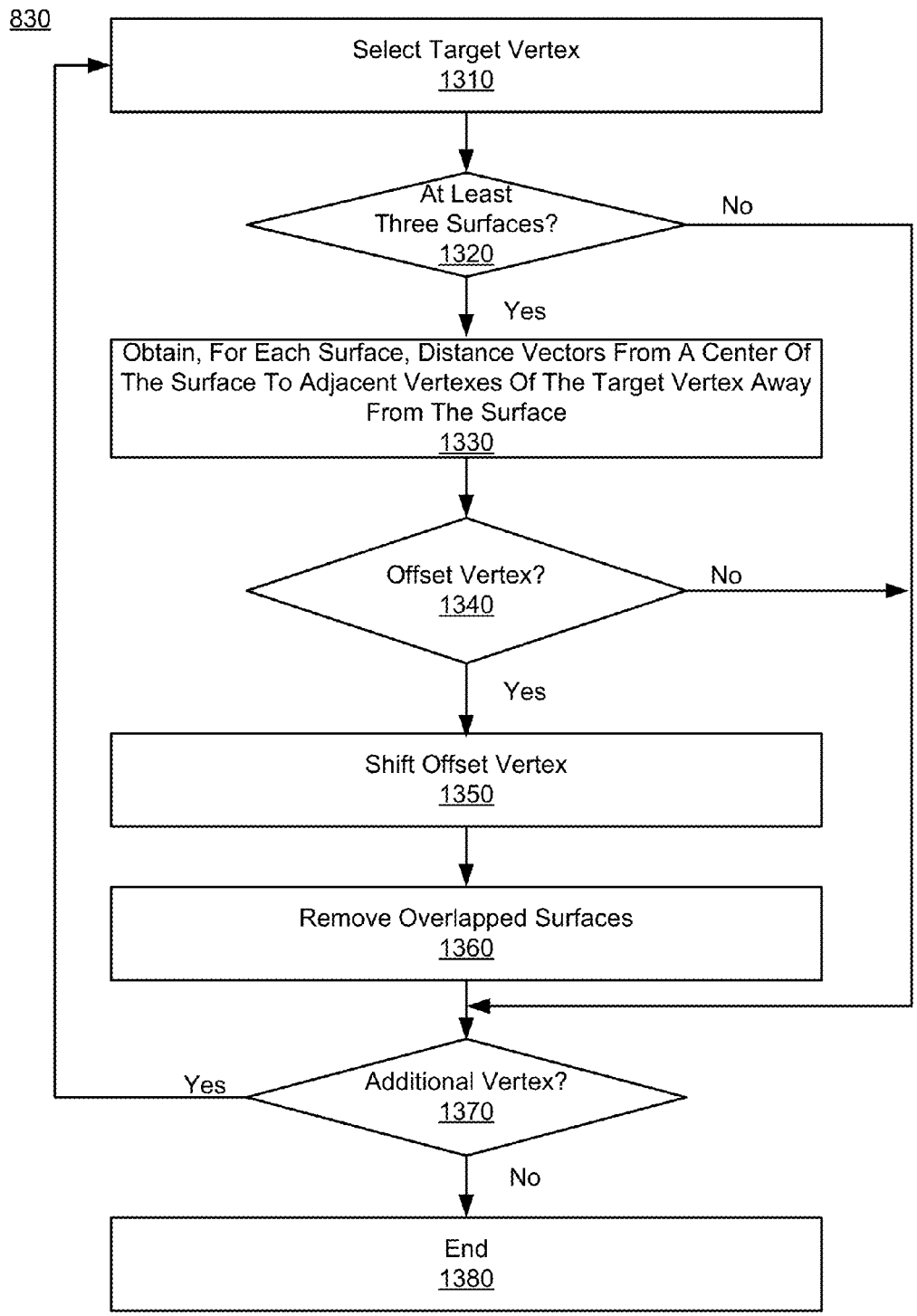
FIG. 13 is a flow chart illustrating a computer implemented process of trimming offset vertexes of a 3-D model, in accordance with an embodiment.

FIG. 13 is a flow chart illustrating a computer implemented process of trimming offset vertexes of a 3-D model (e.g., protruding vertexes or recessed vertexes of polyhedrons from nearby surfaces), in accordance with an embodiment. In one embodiment, the steps in FIG. 13 are part of the step 830 in FIG. 8. Hence, the steps in FIG. 13 are performed by the system 420 of FIG. 4 (e.g., surface optimization module 440). Other entities may perform some or all of the steps in other embodiments. Likewise, embodiments may include different and/or additional steps, or perform the steps in different orders.

The system 420 selects 1310 a target vertex from a plurality of vertexes of the 3-D model. The system 420 determines 1320 whether the target vertex is shared by at least three surfaces (e.g., triangles). Responsive to determining that the target vertex is shared by at least three surfaces, the system 420 obtains 1330, for each of the at least three surfaces, distance vectors to adjacent vertexes of the target vertex away from the surface. A distance vector herein refers to a vector from a center of a surface to an adjacent vertex of the target vertex away from the surface. Each distance vector for a surface has a polarity with respect to a normal vector of the surface. A normal vector can be defined as a direction of a surface facing outside of the 3-D model. If a distance vector of a surface points towards inside of the 3-D model, the distance vector has a different polarity (or a negative polarity) with the normal vector of the surface. Conversely, if a distance vector of a surface points towards outside of the 3-D model, the distance vector has the same polarity (or a positive polarity) with the normal vector of the surface.

The system 420 determines 1340 whether the target vertex is an offset vertex based on polarities of the distance vectors. In one aspect, if each distance vector has the same polarity, the system 420 determines that the target vector is an offset vertex. If the target vectors all have negative polarities, the system 420 determines that the offset vertex is a protruding vertex. On the other hand, if the target vectors all have positive polarities, the system 420 determines that the offset vertex is a recessed vertex. If distance vectors have different polarities, the system 420 determines the target vector is not an offset vertex.

The system 420 shifts 1350 the offset vertex. In one approach, the target vertex is shifted to a closest adjacent vertex of the target vertex. The system 420 removes 1360 any overlapped surfaces. Thus, any offset vertex is effectively removed, and the surface of the 3-D model can be smoothened.

Responsive to determining that the target vertex is not shared by at least three surfaces in step 1320 or the target vertex is not an offset vertex in step 1340, the system 420 proceeds to step 1370.

The system 420 determines 1370 whether an additional vertex needs to be examined. Responsive to determining that an additional vertex needs to be examined, the system 420 proceeds to step 1310 and selects another target vertex from the plurality of vertexes of the 3-D model. If all vertexes are examined, the system 420 ends 1380 the process of trimming offset vertexes of the 3-D model.

Figure 14A:
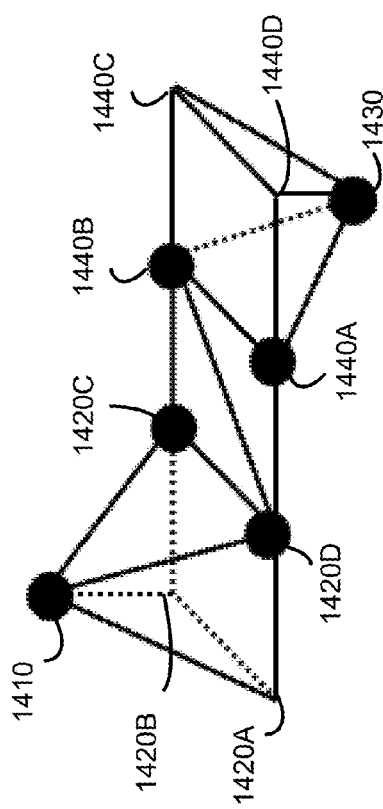
FIG. 14A illustrates an example 3-D model with offset vertexes.

FIG. 14A illustrates an example 3-D model having a surface with offset vertexes 1410 and 1430. The surface of the example 3-D model in FIG. 14A is defined by vertexes 1410, 1420A . . . 1420D, 1430, and 1440A . . . 1440D. The vertex 1410 protrudes from nearby surfaces, where the vertex 1440 is recessed from nearby surfaces.

Figure 14B:
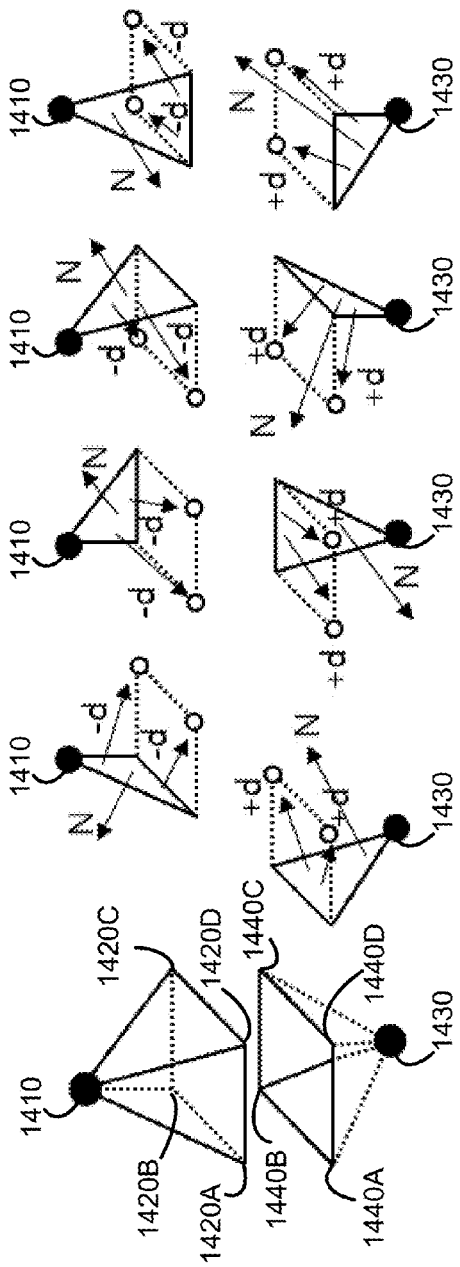
FIG. 14B illustrates an example process of determining offset vertexes of the example 3-D model shown in FIG. 14A, according to the computer implemented process shown in FIG. 13.

FIG. 14B illustrates an example process of determining offset vertexes 1410 and 1430 of the example 3-D model shown in FIG. 14A, according to the computer implemented process shown in FIG. 13.

The system 420 selects a vertex 1410 shared by four triangles: a first triangle having vertexes 1420A, 1420B, 1410, a second triangle having vertexes 1420B, 1420C, 1410, a third triangle having vertexes 1420C, 1420D, 1410, and a fourth triangle having vertexes 1420D, 1420A, 1410. The system 420 determines that distance vectors from a center of the first triangle to the vertexes 1420C, 1420D, distance vectors from a center of the second triangle to the vertexes 1420A, 1420D, distance vectors from a center of the third triangle to the vertexes 1420A, 1420B, and distance vectors from a center of the fourth triangle to the vertexes 1420B, 1420C, all have negative polarities (i.e., point towards inside of the 3-D model). Hence, the system 420 determines that the vertex 1410 is an offset vertex (or a protruding vertex).

Similarly, the system 420 selects a vertex 1430 shared by four triangles: a fifth triangle having vertexes 1440A, 1440B, 1430, a sixth triangle having vertexes 1440B, 1440C, 1430, a seventh triangle having vertexes 1440C, 1440D, 1430, and an eighth triangle having vertexes 1440D, 1440A, 1430. The system 420 determines that distance vectors from a center of the fifth triangle to the vertexes 1440C, 1440D, distance vectors from a center of the sixth triangle to the vertexes 1440A, 1440D, distance vectors from a center of the seventh triangle to the vertexes 1440A, 1440B, and distance vectors from a center of the eighth triangle to the vertexes 1440B, 1440C, all have positive polarities (i.e., point towards outside of the 3-D model). Hence, the system 420 determines that the vertex 1430 is an offset vertex (or a recessed vertex).

Figure 14C:
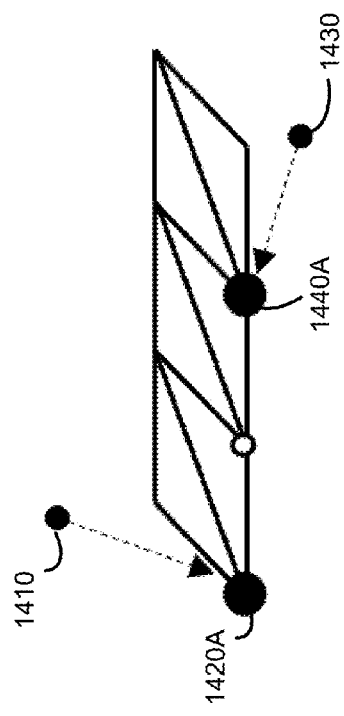
FIG. 14C illustrates an example surface after removing offset vertexes of the example 3-D model of FIG. 14A, according to the computer implemented process shown in FIG. 13.

FIG. 14C illustrates an example surface after removing offset vertexes 1410, 1430 of the example 3-D model of FIG. 14A, according to the computer implemented process shown in FIG. 13. The system identifies a first closest adjacent vertex 1420A of the vertex 1410, and a second closest adjacent vertex 1440A, and shifts the vertexes 1410, 1430 to adjacent vertexes 1420A and 1440A, respectively. In case distances from an offset vertex to its adjacent vertexes are all equal, the system 420 may select any one of the adjacent vertexes, and shifts the offset vertex to the selected adjacent vertex. The system 420 also removes overlapped triangles (e.g., first triangle, fourth triangle, fifth triangle, and eighth triangle of FIG. 14B).

Figure 14D:
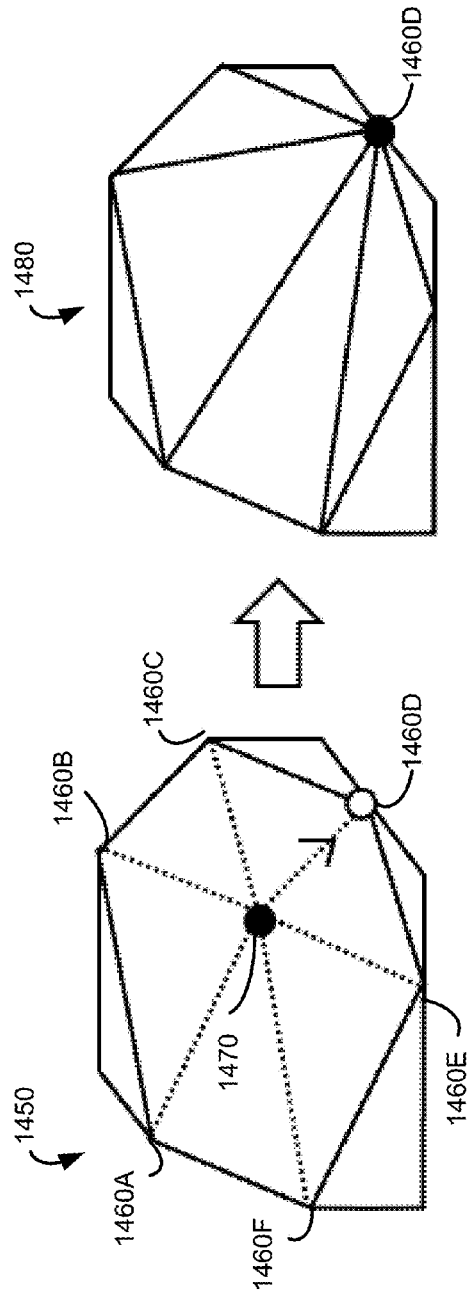
FIG. 14D illustrates an example 3-D model before trimming an offset vertex of the 3-D model and an example 3-D model after trimming the offset vertex, according to the computer implemented process shown in FIG. 13.

FIG. 14D illustrates an example 3-D model 1450 before trimming an offset vertex of the 3-D model 1450 and an example 3-D model 1480 after trimming the offset vertex, according to the computer implemented process shown in FIG. 13. In one embodiment, the 3-D model 1450 is obtained after synthesizing orthogonal surfaces as shown in FIGS. 11 and 12.

In FIG. 14D, the 3-D model 1450 includes a vertex 1470 and adjacent vertexes 1460A, 1460B . . . 1460F. The system 420 determines the vertex 1470 is an offset vertex (e.g., protruding vertex), because all of distance vectors of triangles sharing the vertex 1470 have negative polarities (i.e., point towards inside of the 3-D model 1450) through a process described in detail with respect to FIGS. 13, 14A and 14B. Thus, the system 420 shifts the vertex 1470 to its closest adjacent vertex 1460D, and removes overlapping triangles.

Figure 15:
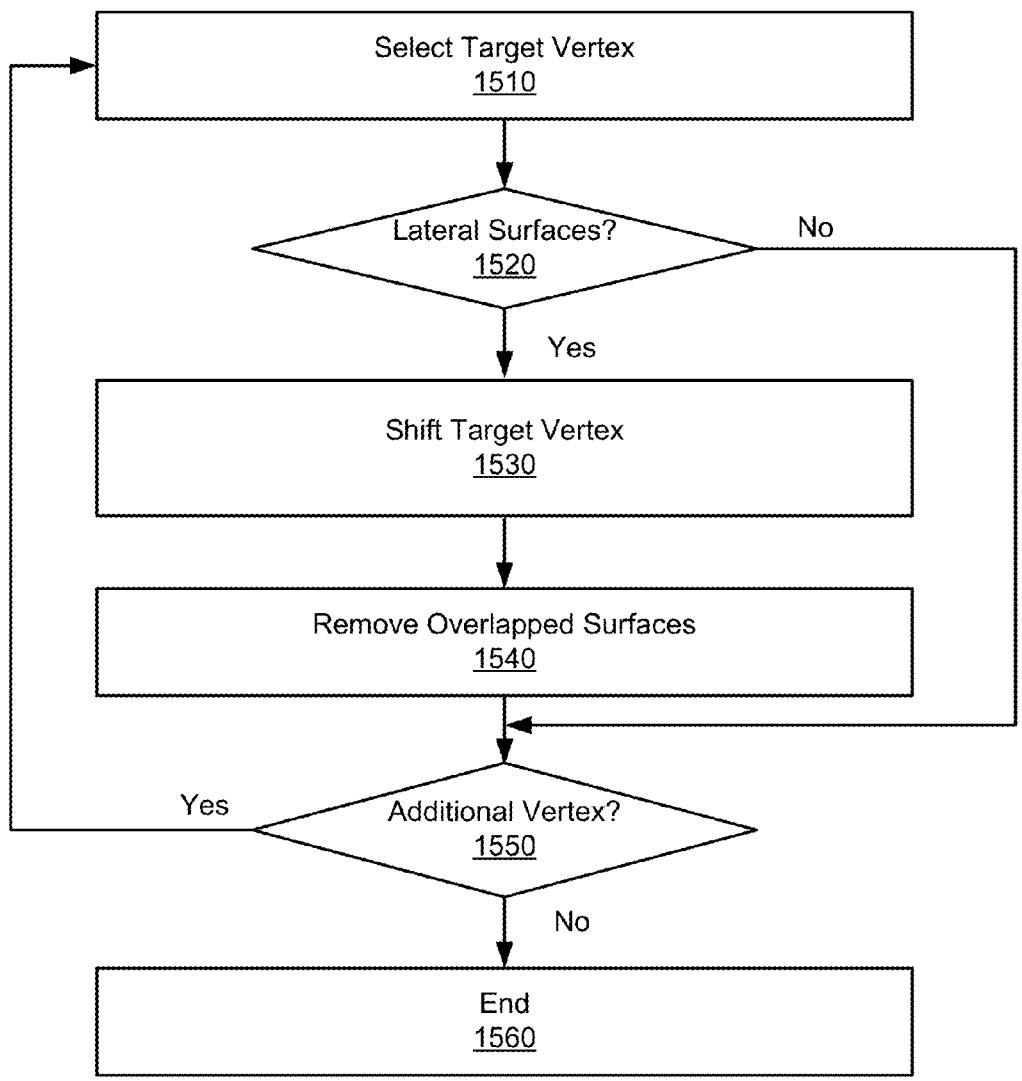
FIG. 15 is a flow chart illustrating a computer implemented process of synthesizing lateral surfaces of a 3-D model, in accordance with an embodiment.

FIG. 15 is a flow chart illustrating a computer implemented process of synthesizing lateral surfaces of a 3-D model, in accordance with an embodiment. In one embodiment, the steps in FIG. 15 are part of the step 840 in FIG. 8. Hence, the steps in FIG. 15 are performed by the system 420 of FIG. 4 (e.g., surface optimization module 440). Other entities may perform some or all of the steps in other embodiments. Likewise, embodiments may include different and/or additional steps, or perform the steps in different orders.

The system 420 selects 1510 a target vertex from a plurality of vertexes of the 3-D model. The system 420 determines 1520 whether surfaces (e.g., triangles) sharing the target vertex are lateral surfaces having substantially similar orientations. In one approach, the system 420 determines orientations of surfaces sharing the target vertex, according to normal vectors of the surfaces. In one approach, the system 420 obtains an average orientation (e.g., an average vector of the normal vectors) of the surfaces sharing the target vertex. If an orientation of a surface deviates from the average orientation by a predetermined orientation range (e.g., a predetermined vector range), the system 420 determines that the surfaces are not lateral surfaces. If orientations of the surfaces sharing the target vertex are within the predetermined vector range from the average orientation, the system 420 determines that the surfaces are lateral surfaces.

Responsive to determining that the surfaces sharing the target vertex are lateral surfaces, the system 420 shifts 1530 the target vertex. In one approach, the target vertex is shifted to a closest adjacent vertex of the target vertex. The system 420 removes 1540 any overlapped surfaces. Effectively, the lateral surfaces are synthesized (or merged) into a single surface.

Responsive to determining that the surfaces sharing the target vertex are not lateral surfaces in step 1520, the system 420 proceeds to step 1550.

The system 420 determines 1550 whether an additional vertex needs to be examined. Responsive to determining that an additional vertex needs to be examined, the system 420 proceeds to step 1510 and selects another target vertex from the plurality of vertexes of the 3-D model. If all vertexes are examined, the system 420 ends 1560 the process of synthesizing the lateral surfaces of the 3-D model.

FIG. 16 illustrates an example 3-D model 1610 before synthesizing lateral surfaces of a 3-D model 1610 and an example 3-D model 1650 after synthesizing the lateral surfaces, according to the computer implemented process shown in FIG. 15.

In FIG. 16, the 3-D model 1610 includes a vertex 1620 and adjacent vertexes 1630A, 1630B, 1630C. The vertex 1620 is shared by a first triangle having vertexes 1630A, 1630B, 1620, a second triangle having vertexes 1630B, 1630C, 1620, and a third triangle having vertexes 1630A, 1630C, 1620. The system 420 obtains normal vectors V1, V2, V3 of the first triangle, the second triangle, and the third triangle, respectively. The system 420 obtains an average normal vector Vavg, and determines that normal vectors V1, V2, V3 are within a predetermined vector range from the average vector. Therefore, the system 420 determines that the first triangle, second triangle, and third triangle sharing the vertex 1620 are lateral triangles.

The system 420 shifts the vertex 1620 to its closest adjacent vertex 1630A. In case distances from a common vertex shared by the lateral triangles to its adjacent vertexes are all equal, the system 420 may select any one of the adjacent vertexes, and shifts the vertex 1620 to the selected adjacent vertex. The system also removes overlapped triangles (e.g., the first triangle and the third triangle sharing the vertex 1620). Thus, the first triangle, the second triangle and the third triangle are effectively merged into a single triangle having vertexes 1630A, 1630B, 1630C.

Figure 17:
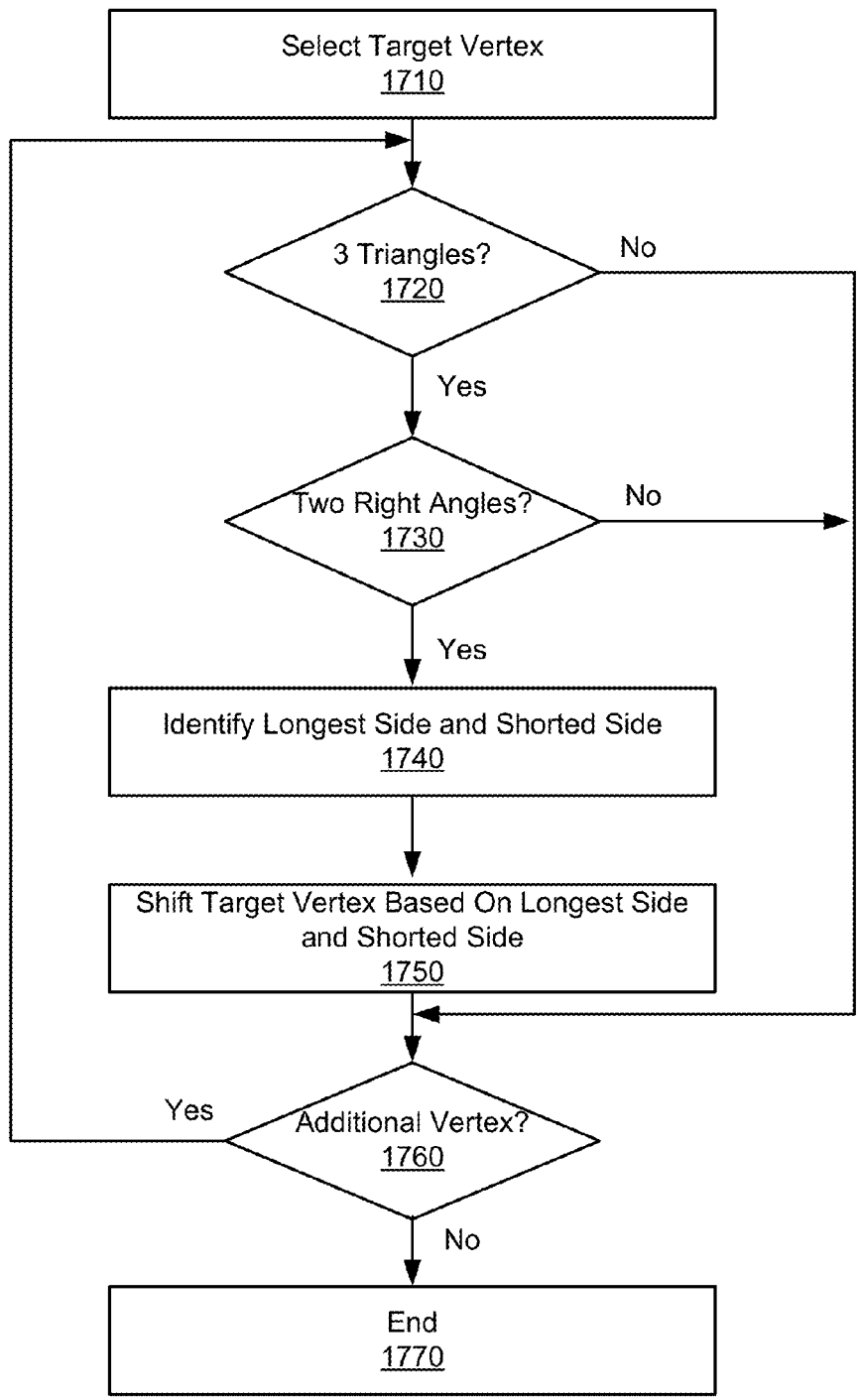
FIG. 17 is a flow chart illustrating a computer implemented process of balancing sides of a 3-D model, in accordance with an embodiment.

FIG. 17 is a flow chart illustrating a computer implemented process of balancing sides of a 3-D model, in accordance with an embodiment. In one embodiment, the steps in FIG. 17 are part of the step 850 in FIG. 8. Hence, the steps in FIG. 17 are performed by the system 420 of FIG. 4 (e.g., surface optimization module 440). Other entities may perform some or all of the steps in other embodiments. Likewise, embodiments may include different and/or additional steps, or perform the steps in different orders.

The system 420 selects 1710 a target vertex from a plurality of vertexes of the 3-D model. The system 420 determines 1720 whether the target vertex is shared by at least three surfaces (e.g., triangles). Responsive to determining that the target vertex is shared by at least three surfaces, the system 420 determines 1730 whether two 90° angles are formed at the target vertex. Responsive to determining that at least two 90° angles are formed at the target vertex, the system 420 identifies 1740 a longest side and a shorted side each having the target vertex as its end.

The system 420 shifts 1750 the target vertex based on the longest side and the shorted side identified. In one approach, the system 420 obtains a difference between a length of the longest side and a length of the shortest side, and shifts the target vertex towards another end of the longest side by a half of the difference.

Responsive to determining that the target vertex is not shared by at least three triangles in step 1720 or at least two 90° angles are not formed at the target vertex in step 1730, the system 420 proceeds to step 1760.

The system 420 determines 1760 whether an additional vertex needs to be examined. Responsive to determining that an additional vertex needs to be examined, the system 420 proceeds to step 1710 and selects another target vertex from the plurality of vertexes of the 3-D model. If all vertexes are examined, the system 420 ends 1770 the process of balancing sides of the 3-D model.

Figure 18:
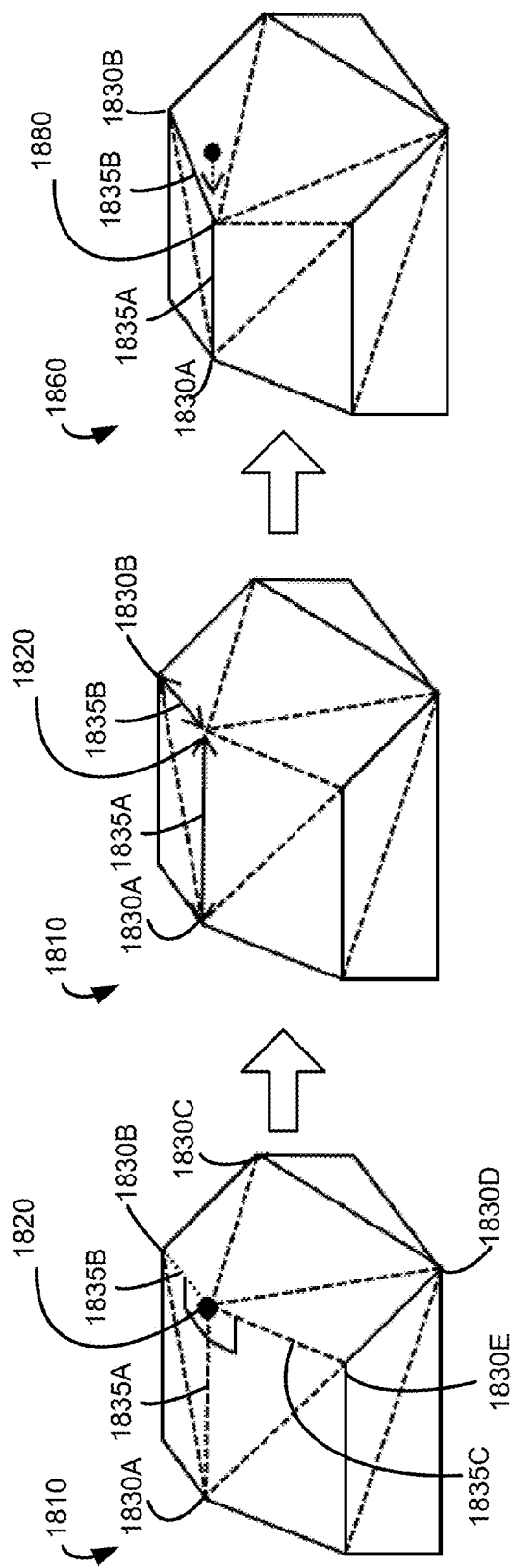
FIG. 18 illustrates an example 3-D model before balancing sides of a 3-D model and an example 3-D model after balancing the sides, according to the computer implemented process shown in FIG. 17.

FIG. 18 illustrates an example 3-D model 1810 before balancing sides of a 3-D model 1810 and an example 3-D model 1880 after balancing the sides, according to the computer implemented process shown in FIG. 17. In one embodiment, the 3-D model 1810 is obtained after synthesizing lateral surfaces as shown in FIGS. 15 and 16.

In FIG. 18, the 3-D model 1810 includes a vertex 1820 and adjacent vertexes 1830A . . . 1830E. The system 420 determines that the vertex 1820 has five triangles sharing the vertex 1820, and two 90° angles are formed at the vertex 1820. Thus, the system 420 balances sides of the 3-D model 1810 sharing the vertex 1820. In one aspect, the system 420 identifies a longest side 1835A and a shorted side 1835B sharing the vertex 1820. The system 420 obtains a difference between a length of the side 1835A and a length of the side 1835B, and shifts the vertex 1820 towards the vertex 1830A by a half of the difference. Accordingly, the 3-D model 1860 after balancing has more balanced length of sides than the 3-D model 1810 before balancing.

Figure 19A:
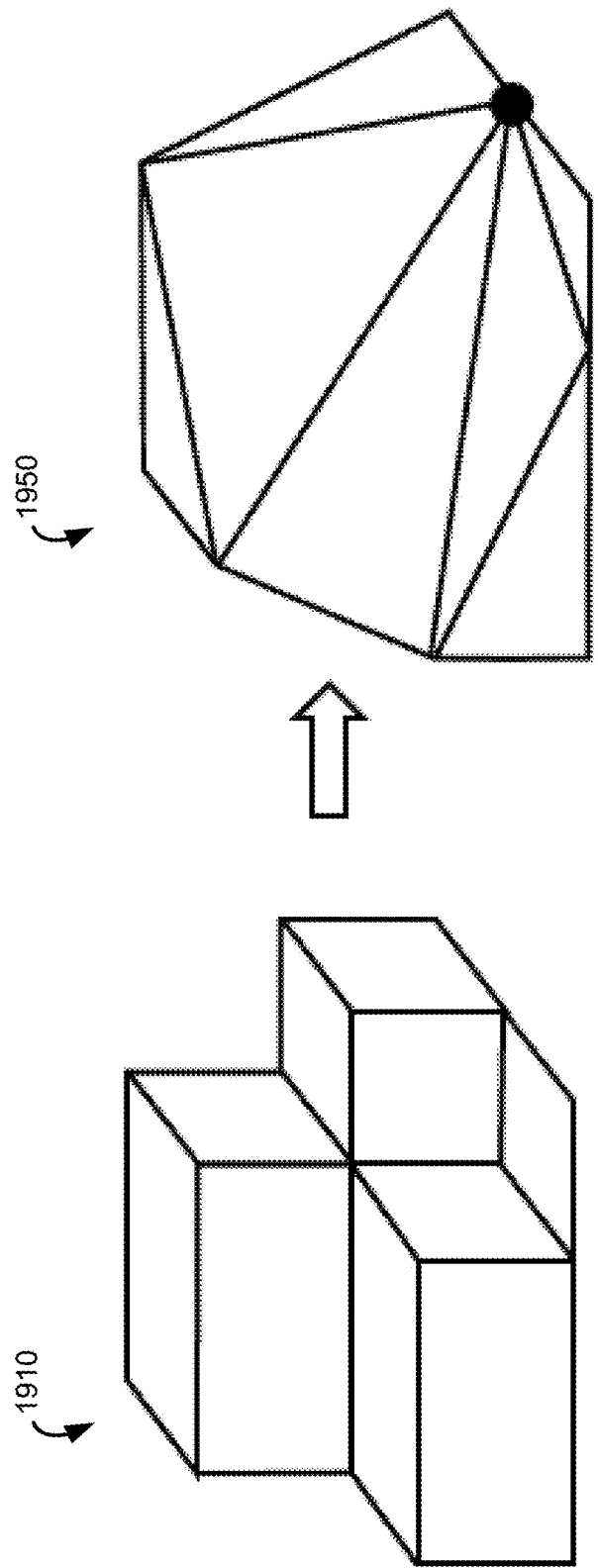
FIG. 19A illustrates an example 3-D model including hexahedron models before performing surface optimization on the 3-D model, and an example 3-D model after performing surface optimization, in accordance with one embodiment.

FIG. 19A illustrates an example 3-D model 1910 including hexahedron models before performing surface optimization on the 3-D model 1910, and an example 3-D model 1950 after performing surface optimization, in accordance with one embodiment. As shown in FIG. 19A, rough or bumpy surfaces of the 3-D model 1910 is smoothened by performing surface optimization as described in detail with respect to FIGS. 8 through 18.

Figure 19C:
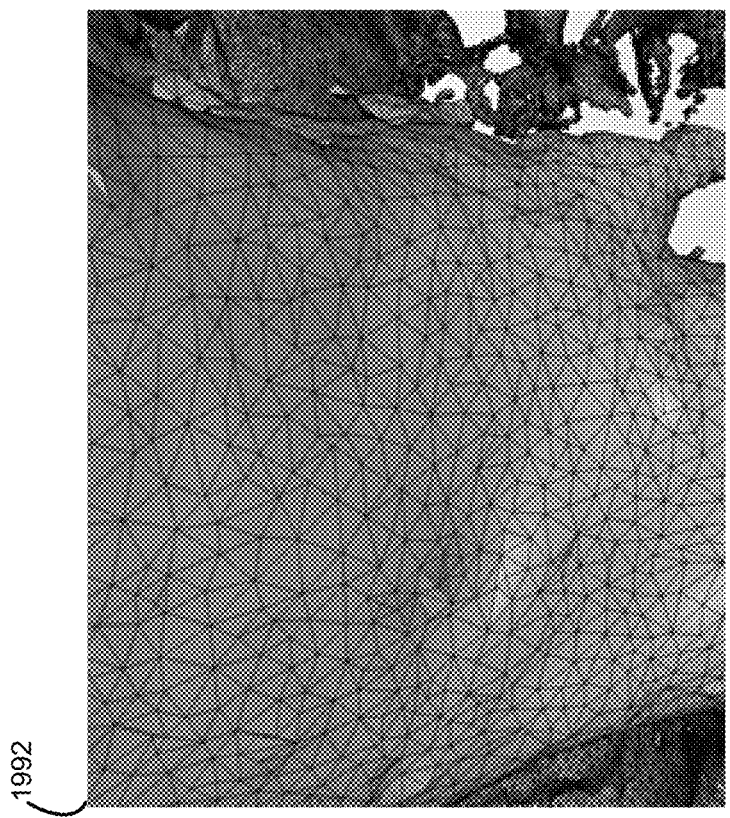
FIG. 19C is an expanded diagram of a portion of the example 3-D model shown in FIG. 19B, in accordance with an embodiment.
Figure 19B:
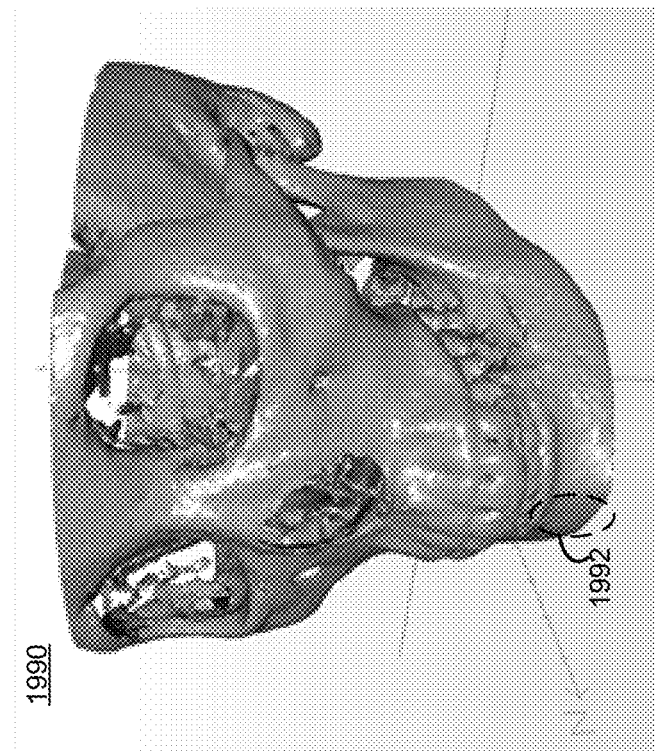
FIG. 19B illustrates an example 3-D model after performing surface optimization on the 3-D model including hexahedron models shown in FIG. 7E, in accordance with one embodiment.

FIG. 19B illustrates an example 3-D model 1990 after performing surface optimization on the 3-D model 790 including hexahedron models shown in FIG. 7E, in accordance with one embodiment. Compared to the 3-D model 790 in FIG. 7E without performing the surface optimization as disclosed herein, the 3-D model 1990 includes smoothened surfaces and is optimized to have more realistic shape than the 3-D model 790.

FIG. 19C is an expanded diagram of a portion 1992 of the example 3-D model 1990 shown in FIG. 19B, in accordance with an embodiment. In the example diagram shown in FIG. 19C, a surface of the 3-D model 1990 consists of a plurality of triangles to represent complex shapes of a human skull.

Computing Machine Architecture

Figure 20:
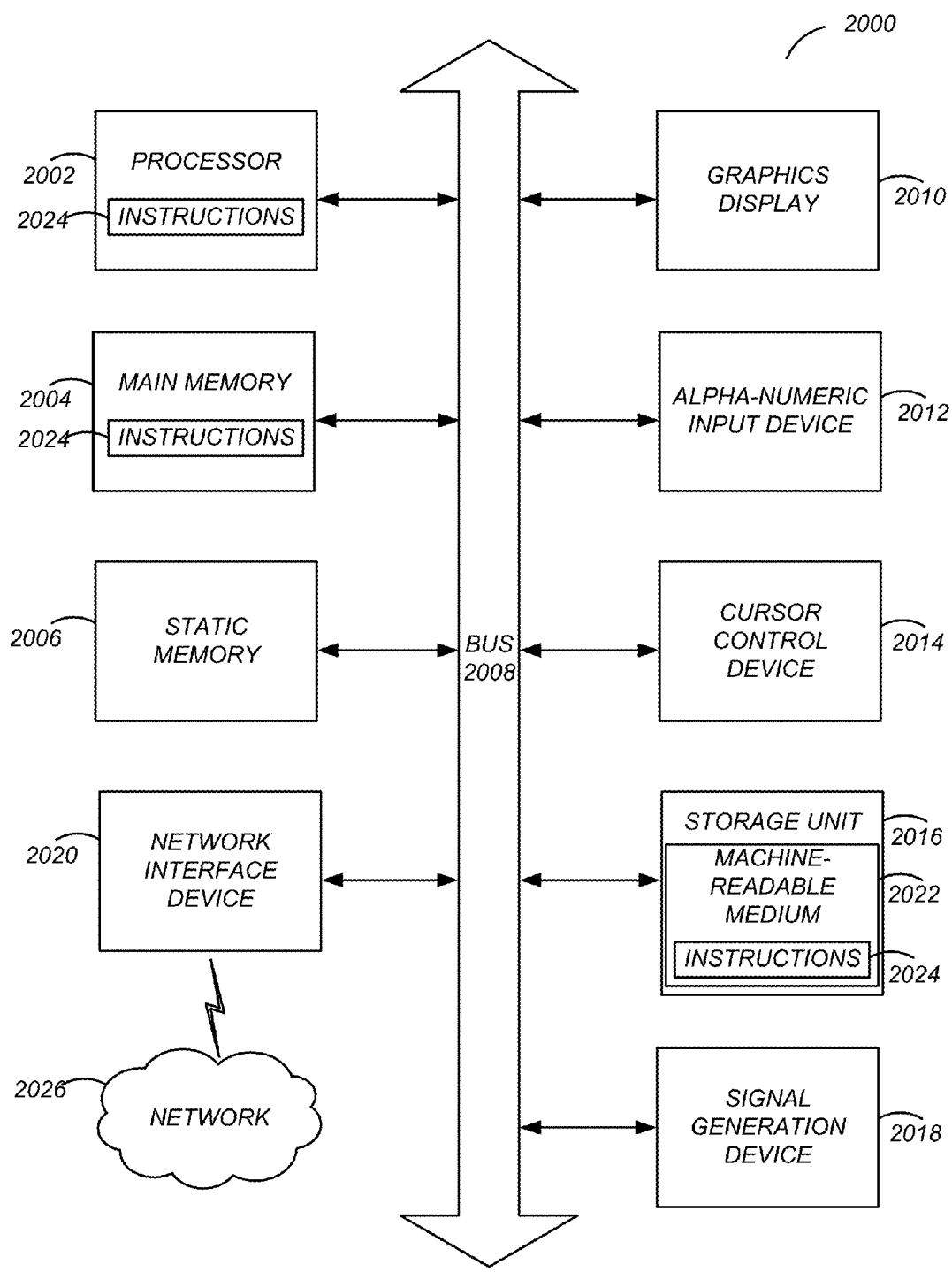
FIG. 20 illustrates components of an example machine (e.g., computer) able to read instructions from a machine-readable medium and execute them in a processor (or controller) in accordance with an embodiment.

FIG. 20 is a block diagram illustrating components of an example machine able to read instructions from a machine-readable medium and execute them in a processor (or controller). Specifically, FIG. 20 shows a diagrammatic representation of a machine in the example form of a computer system 2000 within which instructions 2024 (e.g., software or program code) for causing the machine to perform any one or more of the methodologies discussed herein, e.g., with FIGS. 1-19, may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2024 (sequential or otherwise) that specify actions to be taken by that machine. Further, while only a single machine is illustrated, the term "machine" shall also be taken to include any collection of machines that individually or jointly execute instructions 2024 to perform any one or more of the methodologies discussed herein.

The example computer system 2000 includes one or more processors (generally, processor 2002) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2004, and a static memory 2006, which are configured to communicate with each other via a bus 2008. The computer system 2000 may further include graphics display unit 2010 (e.g., a plasma display panel (PDP), a liquid crystal display (LCD), a projector, or a cathode ray tube (CRT)). The computer system 2000 may also include alphanumeric input device 2012 (e.g., a keyboard), a cursor control device 2014 (e.g., a mouse, a trackball, a joystick, a motion sensor, or other pointing instrument), a storage unit 2016, a signal generation device 2018 (e.g., a speaker), and a network interface device 2020, which also are configured to communicate via the bus 2008.

The storage unit 2016 includes a machine-readable medium 2022 on which is stored instructions 2024 embodying any one or more of the methodologies or functions described herein. The instructions 2024 may also reside, completely or at least partially, within the main memory 2004 or within the processor 2002 (e.g., within a processor's cache memory) during execution thereof by the computer system 2000, the main memory 2004 and the processor 2002 also constituting machine-readable media. The instructions 2024 may be transmitted or received over a network 2026 via the network interface device 2020.

While machine-readable medium 2022 is shown in an example embodiment to be a single medium, the term "machine-readable medium" should be taken to include a single medium or multiple media (e.g., a centralized or distributed database, or associated caches and servers) able to store instructions (e.g., instructions 2024). The term "machine-readable medium" shall also be taken to include any medium that is capable of storing instructions (e.g., instructions 2024) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

In one aspect, the principles disclosed herein can be applied in medical applications. For example, a virtual 3-D model can be generated based on 2-D cross-sectional images in Digital Imaging and Communications in Medicine (DICOM) file format. The 3-D model can be represented by 3-D model data, which can be converted into any conventional 3-D description format (e.g., STL format, 3DMAX'S 3DS format, MAYA's OBJ format, etc.). The 3-D model can be visually presented to help determine a medical condition of a patient, isolate a cause of structural issues of body parts, or simulate a case after a certain operation (e.g., dental implant, orthopedic surgery, etc.) is performed. In addition, the 3-D model can be rendered into a tangible form through a 3-D printing to help prepare medical doctors for surgeries, generate replacement body parts, etc.

The disclosed principles herein can also be applied in other applications (e.g., 3-D animation, gaming, 3-D CAD, etc.) in which 3-D models are employed.

Advantages of the disclosed configurations include generating a virtual 3-D model including hexahedron models that can accurately represent objects with complex shapes (e.g., objects intertwined with each other, or objects placed within another object). For example, a user may select a few objects (e.g., bones, artery, ligaments, any organ, or any combination of thereof) on a 2-D cross-sectional image, and generate a localized 3-D model without non-selected body parts to represent how the selected parts are structured in a virtual 3-D space. Moreover, by generating the 3-D model based on a plurality of virtual hexahedron models, the 3-D model is guaranteed to have a closed shape, which allows 3-D printing to be performed accurately.

Further, by performing surface optimization on a 3-D model including hexahedron models as disclosed herein, rough or bumpy surfaces of the 3-D model can be smoothened in an efficient manner in terms of processing resources (e.g., processor thread, storage capacity, etc.). For example, a number of vertexes and surfaces (e.g., triangles) to be analyzed for smoothening surfaces of the 3-D model including tens of millions of hexahedron models can be reduced by an order of magnitude by performing surface optimization as disclosed herein. As a result, the processing resources can be conserved.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 2002, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of generating 3-D model data of a virtual 3-D model including virtual hexahedrons through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of generating 3-dimensional model data based on a plurality of 2-dimensional cross-sectional images of a 3-dimensional object, the method comprising:
    receiving a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensionsional axes, the second cross-sectional image corresponding to a second location of the 3-dimensional object along the one of the 3-dimensional axes separated from the first location, both the first set of image data and the second set of image data including 2-dimensional coordinates and pixel values, each pixel of the first cross-sectional image and the second cross-sectional image associated with its 2-dimensional coordinate and pixel value;
    identifying a first set of 2-dimensional coordinates of a first set of pixels from the pixels of the first cross-sectional image, the first set of pixels associated with first pixel values within a predetermined pixel value range;
    identifying a second set of 2-dimensional coordinates of a second set of pixels from the pixels of the second cross-sectional image, the second set of pixels associated with second pixel values within the predetermined pixel value range;
    generating a first set of hexahedron data representing first hexahedron models, each of the first set of hexahedron data associated with a corresponding hexahedron model from the first hexahedron models at a corresponding coordinate from the first set of 2-dimensional coordinates;
    generating a second set of hexahedron data representing second hexahedron models, each of the second set of hexahedron data associated with a corresponding hexahedron model from the second hexahedron models at a corresponding coordinate from the second set of 2-dimensional coordinates; and
    generating the 3-dimensional model data based on the first set of hexahedron data and the second set of hexahedron data.

2. The computer-implemented method of claim 1, wherein each of the first hexahedron models has a uniform height, and each of the second hexahedron models has the uniform height.

3. The computer-implemented method of claim 2, wherein the uniform height corresponds to a distance between the first location and the second location along said one of the 3-dimensional axes.

4. The computer-implemented method of claim 1, wherein generating the 3-dimensional model data based on the first set of hexahedron data and the second set of hexahedron data comprises:
    adjoining adjacent hexahedron models among the first hexahedron models and the second hexahedron models.

5. The computer-implemented method of claim 4, wherein adjoining the adjacent hexahedron models among the first hexahedron models and the second hexahedron models comprises:
    generating surface data including coordinates of closed surfaces of the adjoined hexahedron models, the adjoined hexahedron models surrounded by the closed surfaces.

6. The computer-implemented method of claim 5, wherein the surface data does not include coordinates of open surfaces between two adjacent hexahedron models.

7. The computer-implemented method of claim 5, wherein each of the closed surfaces of the hexahedron models consists of two triangles.

8. The computer-implemented method of claim 7, wherein generating the 3-dimensional model data based on the first set of hexahedron data and the second set of hexahedron data further comprises:
    identifying a vertex of the adjoined hexahedron models to be removed, the vertex being a common vertex for three triangles of the closed surfaces, the three triangles orthogonal to each other;
    generating a new triangle having adjacent vertexes of the common vertex for its three vertexes; and
    removing the vertex and the three triangles.

9. The computer-implemented method of claim 7, wherein generating the 3-dimensional model data based on the first set of hexahedron data and the second set of hexahedron data comprises:
    identifying a first triangle and a second triangle of the adjoined hexahedron models sharing a common side, the first triangle and the second triangle orthogonal to each other;
    generating a new triangle having three vertexes, the three vertexes including: a first vertex of the first triangle away from the common side, a second vertex of the second triangle away from the common side, and a third vertex being a first end of the common side; and removing a second end of the common side, the first triangle and the second triangle.

10. The computer-implemented method of claim 7, wherein generating the 3-dimensional model data based on the first set of hexahedron data and the second set of hexahedron data comprises:
identifying an offset vertex, the offset vertex shared by three triangles, each of the three triangles having a distance vector from a center of a triangle to an adjacent vertex of the offset vertex away from the triangle, distance vectors of said each of the three triangles having a same polarity;
shifting the offset vertex to an adjacent vertex of the offset vertex; and
removing overlapping triangles after shifting the offset vertex.

11. The computer-implemented method of claim 7, wherein generating the 3-dimensional model data based on the first set of hexahedron data and the second set of hexahedron data comprises:
identifying three lateral triangles of the adjoined hexahedron models, the three lateral triangles sharing a common vertex and being oriented within a predetermined surface orientation range;
generating a new triangle having adjacent vertexes of the common vertex for its three vertexes; and
removing the common vertex and the three triangles.

12. The computer-implemented method of claim 7, wherein generating the 3-dimensional model data based on the first set of hexahedron data and the second set of hexahedron data comprises:
identifying two right angle triangles of the adjoined hexahedron models, the two right angle triangles sharing a common vertex and a common side, two right angles of the two right angle triangles formed at the common vertex;
identifying a longest side among a plurality of sides, an end of each of the plurality of sides being the common vertex;
identifying a shortest side among the plurality of sides;
obtaining an average between a length of the longest side and a length of the shorted side; and
shifting the common vertex towards an end of the longest side away from the common vertex by a half of the average.

13. The computer-implemented method of claim 1, further comprising:
receiving a third set of image data representing a third cross-sectional image of the plurality of 2-dimensional cross-sectional images, the third cross-sectional image corresponding to a third location of the 3-dimensional object along the one of 3-dimensional axes;
identifying a third set of 2-dimensional coordinates of a third set of pixels from pixels of the third cross-sectional image, the third set of pixels associated with third pixel values within the predetermined pixel value range; and
generating a third set of hexahedron data representing third hexahedron models, each of the third set of hexahedron data associated with a corresponding hexahedron model from the third hexahedron models at a corresponding coordinate from the third set of 2-dimensional coordinates, wherein the 3-dimensional model data are generated further based on the third set of hexahedron data.

14. A non-transitory computer readable storage medium comprising instructions to generate 3-dimensional model data based on a plurality of 2-dimensional cross-sectional images of a 3-dimensional object, the instructions when executed by a processor cause the processor to:
receive a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensionsional axes, the second cross-sectional image corresponding to a second location of the 3-dimensional object along the one of the 3-dimensional axes separated from the first location, both the first set of image data and the second set of image data including 2-dimensional coordinates and pixel values, each pixel of the first cross-sectional image and the second cross-sectional image associated with its 2-dimensional coordinate and pixel value;
identify a first set of 2-dimensional coordinates of a first set of pixels from the pixels of the first cross-sectional image, the first set of pixels associated with first pixel values within a predetermined pixel value range;
identify a second set of 2-dimensional coordinates of a second set of pixels from the pixels of the second cross-sectional image, the second set of pixels associated with second pixel values within the predetermined pixel value range;
generate a first set of hexahedron data representing first hexahedron models, each of the first set of hexahedron data associated with a corresponding hexahedron model from the first hexahedron models at a corresponding coordinate from the first set of 2-dimensional coordinates;
generate a second set of hexahedron data representing second hexahedron models, each of the second set of hexahedron data associated with a corresponding hexahedron model from the second hexahedron models at a corresponding coordinate from the second set of 2-dimensional coordinates; and
generate the 3-dimensional model data based on the first set of hexahedron data and the second set of hexahedron data.

15. The non-transitory computer readable storage medium of claim 14, wherein each of the first hexahedron models has a uniform height, and each of the second hexahedron models has the uniform height.

16. The non-transitory computer readable storage medium of claim 15, wherein the uniform height corresponds to a distance between the first location and the second location along said one of the 3-dimensional axes.

17. The non-transitory computer readable storage medium of claim 14, wherein the instructions when executed by the processor cause the processor to generate the 3-dimensional model data based on the first set of hexahedron data and the second set of hexahedron data further comprise instructions when executed by the processor cause the processor to:
adjoin adjacent hexahedron models among the first hexahedron models and the second hexahedron models.

18. The non-transitory computer readable storage medium of claim 17, wherein the instructions when executed by the processor cause the processor to adjoin the adjacent hexahedron models among the first hexahedron models and the second hexahedron models further comprise instructions when executed by the processor cause the processor to:

generate surface data including coordinates of closed surfaces of the adjoined hexahedron models, the adjoined hexahedron models surrounded by the closed surfaces.

19. The non-transitory computer readable storage medium of claim 18, wherein the surface data does not include coordinates of open surfaces between two adjacent hexahedron models.

20. The non-transitory computer readable storage medium of claim 18, wherein each of the closed surfaces of the hexahedron models consists of two triangles.

21. A system for generating 3-dimensional model data based on a plurality of 2-dimensional cross-sectional images of a 3-dimensional object, the system comprising:

a processor; and a non-transitory computer readable storage medium comprising instructions when executed by the processor cause the processor to:

receive a first set of image data and a second set of image data, the first set of image data representing a first cross-sectional image of the plurality of 2-dimensional cross-sectional images, the second set of image data representing a second cross-sectional image of the plurality of 2-dimensional cross-sectional images, the first cross-sectional image corresponding to a first location of the 3-dimensional object along one of 3-dimensionsional axes, the second cross-sectional image corresponding to a second location of the 3-dimensional object along the one of the 3-dimensional axes separated from the first location, both the first set of image data and the second set of image data including 2-dimensional coordinates and pixel values, each pixel of the first cross-sectional image and the second cross-sectional image associated with its 2-dimensional coordinate and pixel value, identify a first set of 2-dimensional coordinates of a first set of pixels from the pixels of the first cross-sectional image, the first set of pixels associated with first pixel values within a predetermined pixel value range, identify a second set of 2-dimensional coordinates of a second set of pixels from the pixels of the second cross-sectional image, the second set of pixels associated with second pixel values within the predetermined pixel value range, generate a first set of hexahedron data representing first hexahedron models, each of the first set of hexahedron data associated with a corresponding hexahedron model from the first hexahedron models at a corresponding coordinate from the first set of 2-dimensional coordinates, generate a second set of hexahedron data representing second hexahedron models, each of the second set of hexahedron data associated with a corresponding hexahedron model from the second hexahedron models at a corresponding coordinate from the second set of 2-dimensional coordinates, and generate the 3-dimensional model data based on the first set of hexahedron data and the second set of hexahedron data.

\* \* \* \* \*

UNITED STATES PATENT AND TRADEMARK OFFICE
CERTIFICATE OF CORRECTION

PATENT NO. : 9,646,411 B2
APPLICATION NO. : 15/086036
DATED : May 9, 2017
INVENTOR(S) : Myung Hak Lee It is certified that error appears in the above-identified patent and that said Letters Patent is hereby corrected as shown below:

In the Claims

Column 25, Line 52, change "3-dimensionsional" to "3-dimensional".
Column 28, Line 16, change "3-dimensionsional" to "3-dimensional".
Column 29, Line 30, change "3-dimensionsional" to "3-dimensional".

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*